United States Patent
Riley, Jr. et al.

(10) Patent No.: US 8,481,208 B2
(45) Date of Patent: Jul. 9, 2013

(54) BIPOLAR ARTICLES AND RELATED METHODS

(75) Inventors: Gilbert N. Riley, Jr., Marlborough, MA (US); Yet-Ming Chiang, Framingham, MA (US); Antoni S. Gozdz, Marlborough, MA (US); Michael S. Viola, Burlington, MA (US); Ricardo Fulop, Lexington, MA (US)

(73) Assignee: A123 Systems, LLC, Waltham, MA (US)

(*) Notice: Subject to any disclaimer, the term of this patent is extended or adjusted under 35 U.S.C. 154(b) by 172 days.

(21) Appl. No.: 12/816,644

(22) Filed: Jun. 16, 2010

(65) Prior Publication Data

US 2010/0248028 A1    Sep. 30, 2010

Related U.S. Application Data

(63) Continuation of application No. 10/628,681, filed on Jul. 28, 2003, now Pat. No. 7,763,382.

(60) Provisional application No. 60/399,050, filed on Jul. 26, 2002, provisional application No. 60/398,902, filed on Jul. 26, 2002.

(51) Int. Cl.
*H01M 10/18* (2006.01)
*H01M 4/13* (2010.01)
*B05D 5/12* (2006.01)

(52) U.S. Cl.
USPC .................... 429/210; 429/212; 427/115

(58) Field of Classification Search
USPC .................... 429/210–212; 427/115
See application file for complete search history.

(56) References Cited

U.S. PATENT DOCUMENTS

| | | | |
|---|---|---|---|
| 3,765,943 | A | 10/1973 | Biagetti |
| 3,864,167 | A | 2/1975 | Broadhead et al. |
| 4,245,016 | A | 1/1981 | Rampel |
| 4,555,454 | A | 11/1985 | Shuster |
| 4,599,114 | A | 7/1986 | Atkinson |
| 4,615,784 | A | 10/1986 | Stewart et al. |
| 4,668,596 | A | 5/1987 | Shacklette et al. |
| 4,758,483 | A | 7/1988 | Armand et al. |
| 4,889,777 | A | 12/1989 | Akuto |

(Continued)

FOREIGN PATENT DOCUMENTS

| | | |
|---|---|---|
| CA | 2270771 A1 | 10/2000 |
| EP | 0071119 | 2/1983 |

(Continued)

OTHER PUBLICATIONS

"Defects" Unknown book chapter, p. 339-424.

(Continued)

*Primary Examiner* — Karie O'Neill Apicella
(74) *Attorney, Agent, or Firm* — Wilmer Cutler Pickering Hale and Dorr LLP

(57) ABSTRACT

The invention provides bipolar articles (e.g., batteries and capacitors) with new architectures and methods of making and using the same. Articles are provided with interpenetrating anode and cathode structures that allow for improved power density, and arbitrary form factors that allow for formation in substantially any desired shape. The articles are useful for embedding or integral formation in various electronic devices to provide more efficient use of space in the devices. The articles optionally include self-organizing bipolar structures.

12 Claims, 10 Drawing Sheets

U.S. PATENT DOCUMENTS

| | | |
|---|---|---|
| 5,100,747 A | 3/1992 | Hayashida et al. |
| 5,187,209 A | 2/1993 | Hirai et al. |
| 5,213,895 A | 5/1993 | Hirai et al. |
| 5,227,267 A | 7/1993 | Goebel et al. |
| 5,294,504 A | 3/1994 | Otagawa et al. |
| 5,338,625 A | 8/1994 | Bates et al. |
| 5,399,447 A | 3/1995 | Chaloner-Gill et al. |
| 5,405,937 A | 4/1995 | Lemaire et al. |
| 5,436,093 A | 7/1995 | Huang et al. |
| 5,441,830 A | 8/1995 | Moulton et al. |
| 5,464,707 A | 11/1995 | Moulton et al. |
| 5,478,676 A | 12/1995 | Turi et al. |
| 5,518,833 A | 5/1996 | Repplinger et al. |
| 5,520,850 A | 5/1996 | Chaloner-Gill et al. |
| 5,527,641 A | 6/1996 | Koshiishi et al. |
| 5,554,459 A | 9/1996 | Gozdz et al. |
| 5,567,754 A | 10/1996 | Stramel |
| 5,578,396 A | 11/1996 | Fauteux et al. |
| 5,587,253 A | 12/1996 | Gozdz et al. |
| 5,588,971 A | 12/1996 | Fauteux et al. |
| 5,589,297 A | 12/1996 | Koga et al. |
| 5,591,544 A | 1/1997 | Fauteux et al. |
| 5,624,605 A | 4/1997 | Cao et al. |
| 5,635,138 A | 6/1997 | Amatucci et al. |
| 5,654,115 A | 8/1997 | Hasebe et al. |
| 5,677,080 A | 10/1997 | Chen |
| 5,698,342 A | 12/1997 | Klein |
| 5,705,291 A | 1/1998 | Amatucci et al. |
| 5,714,053 A | 2/1998 | Howard |
| 5,733,683 A | 3/1998 | Searson et al. |
| 5,759,714 A | 6/1998 | Matsufuji et al. |
| 5,789,100 A | 8/1998 | Burroughs et al. |
| 5,821,033 A | 10/1998 | Cromack et al. |
| 5,827,615 A | 10/1998 | Touhsaent et al. |
| 5,834,136 A | 11/1998 | Gao et al. |
| 5,840,087 A | 11/1998 | Gozdz et al. |
| 5,843,292 A | 12/1998 | Spiros |
| 5,846,675 A | 12/1998 | Sazhin et al. |
| 5,897,522 A | 4/1999 | Nitzan |
| 5,902,689 A | 5/1999 | Vleggaar et al. |
| 5,910,382 A | 6/1999 | Goodenough et al. |
| 5,925,283 A | 7/1999 | Taniuchi et al. |
| 5,949,213 A | 9/1999 | Lanni |
| 6,063,519 A | 5/2000 | Barker et al. |
| 6,063,525 A | 5/2000 | LaFollette |
| 6,069,221 A | 5/2000 | Chasser et al. |
| RE36,843 E | 8/2000 | Lake et al. |
| 6,096,453 A | 8/2000 | Grunwald |
| 6,096,454 A | 8/2000 | Tran et al. |
| 6,096,494 A | 8/2000 | Tang et al. |
| 6,117,593 A | 9/2000 | Stachoviak et al. |
| 6,120,940 A | 9/2000 | Poehler et al. |
| 6,136,476 A | 10/2000 | Schutts et al. |
| 6,156,453 A | 12/2000 | Shimizu et al. |
| 6,159,389 A | 12/2000 | Miura et al. |
| 6,174,623 B1 | 1/2001 | Shackle |
| 6,190,798 B1 | 2/2001 | Okada et al. |
| 6,231,779 B1 | 5/2001 | Chiang et al. |
| 6,280,875 B1 | 8/2001 | Kwak et al. |
| 6,280,879 B1 | 8/2001 | Andersen et al. |
| 6,287,720 B1 | 9/2001 | Yamashita et al. |
| 6,291,097 B1 | 9/2001 | Barker et al. |
| 6,300,016 B1 | 10/2001 | Jan et al. |
| 6,306,540 B1 | 10/2001 | Hiroi et al. |
| 6,322,924 B1 | 11/2001 | Hirahara et al. |
| 6,337,156 B1 | 1/2002 | Narang et al. |
| 6,342,317 B1 | 1/2002 | Patel et al. |
| 6,358,645 B1 | 3/2002 | Furukawa et al. |
| 6,395,429 B1 | 5/2002 | Kang et al. |
| 6,403,263 B1 | 6/2002 | Roach |
| 6,410,189 B1 | 6/2002 | Yamada et al. |
| 6,413,284 B1 | 7/2002 | Chu et al. |
| 6,413,285 B1 | 7/2002 | Chu et al. |
| 6,432,585 B1 | 8/2002 | Kawakami et al. |
| 6,451,487 B1 | 9/2002 | Besner et al. |
| 6,454,977 B1 | 9/2002 | Kwok et al. |
| 6,495,283 B1 | 12/2002 | Yoon et al. |
| 6,511,780 B1 | 1/2003 | Veregin et al. |
| 6,528,033 B1 | 3/2003 | Barker et al. |
| 6,555,268 B1 | 4/2003 | Inoue et al. |
| 6,599,662 B1 | 7/2003 | Chiang et al. |
| 6,645,675 B1 | 11/2003 | Munshi |
| 6,664,006 B1 | 12/2003 | Munshi |
| 6,730,438 B2 | 5/2004 | Nakanishi et al. |
| 6,753,111 B2 | 6/2004 | Kweon et al. |
| 6,764,525 B1 | 7/2004 | Whitacre et al. |
| 6,787,232 B1 | 9/2004 | Chiang et al. |
| 6,797,435 B2 | 9/2004 | Kweon et al. |
| 6,800,399 B2 | 10/2004 | Matsumoto |
| 6,818,356 B1 | 11/2004 | Bates |
| 6,844,105 B1 | 1/2005 | Hanafusa et al. |
| 6,855,273 B2 | 2/2005 | Ravet et al. |
| 6,878,487 B2 | 4/2005 | Cho et al. |
| 7,026,071 B2 | 4/2006 | Mayes et al. |
| 7,087,348 B2 | 8/2006 | Holman et al. |
| 7,090,785 B2 | 8/2006 | Chiang et al. |
| 7,318,982 B2 | 1/2008 | Gozdz et al. |
| 7,338,734 B2 | 3/2008 | Chiang et al. |
| 7,387,851 B2 | 6/2008 | Gozdz et al. |
| 7,553,584 B2 | 6/2009 | Chiang et al. |
| 7,579,112 B2 | 8/2009 | Chiang et al. |
| 7,662,265 B2 | 2/2010 | Chiang et al. |
| 7,763,382 B2 | 7/2010 | Riley, Jr. et al. |
| 7,781,098 B2 | 8/2010 | Chiang et al. |
| 2001/0005558 A1 | 6/2001 | Yoshioka et al. |
| 2001/0005562 A1 | 6/2001 | Yoshioka et al. |
| 2001/0007726 A1 | 7/2001 | Yoshioka et al. |
| 2001/0043709 A1* | 11/2001 | Panitzsch ............... 381/330 |
| 2002/0000034 A1 | 1/2002 | Jenson |
| 2002/0015278 A1 | 2/2002 | Fukuyama et al. |
| 2002/0028380 A1 | 3/2002 | Tanjo et al. |
| 2002/0036282 A1 | 3/2002 | Chiang et al. |
| 2002/0048706 A1 | 4/2002 | Mayes et al. |
| 2002/0071990 A1 | 6/2002 | Kweon et al. |
| 2002/0071991 A1 | 6/2002 | Kweon et al. |
| 2002/0074972 A1 | 6/2002 | Narang et al. |
| 2002/0192137 A1 | 12/2002 | Chaloner-Gill et al. |
| 2002/0195591 A1 | 12/2002 | Ravet et al. |
| 2003/0003352 A1 | 1/2003 | Kweon et al. |
| 2003/0008212 A1 | 1/2003 | Akashi et al. |
| 2003/0049529 A1 | 3/2003 | Cho et al. |
| 2003/0054250 A1 | 3/2003 | Kweon et al. |
| 2003/0082446 A1* | 5/2003 | Chiang et al. ............ 429/209 |
| 2003/0099884 A1 | 5/2003 | Chiang et al. |
| 2003/0114297 A1 | 6/2003 | Shinn et al. |
| 2004/0005265 A1 | 1/2004 | Chiang et al. |
| 2004/0018429 A1 | 1/2004 | Kweon et al. |
| 2004/0018430 A1 | 1/2004 | Holman et al. |
| 2004/0018431 A1 | 1/2004 | Gozdz et al. |
| 2004/0151887 A1 | 8/2004 | Forrest et al. |
| 2004/0185343 A1 | 9/2004 | Wang et al. |
| 2004/0265692 A1 | 12/2004 | Long et al. |
| 2005/0026037 A1 | 2/2005 | Riley et al. |
| 2005/0034993 A1 | 2/2005 | Gozdz et al. |
| 2005/0175529 A1 | 8/2005 | Ceder et al. |
| 2005/0181280 A1 | 8/2005 | Ceder et al. |
| 2005/0272214 A1 | 12/2005 | Chiang et al. |
| 2006/0035143 A1 | 2/2006 | Kida et al. |
| 2006/0102455 A1 | 5/2006 | Chiang et al. |
| 2006/0234131 A1 | 10/2006 | Takami et al. |
| 2007/0009801 A1 | 1/2007 | Inagaki et al. |
| 2007/0275300 A1 | 11/2007 | Salot et al. |
| 2008/0099734 A1 | 5/2008 | Chiang et al. |
| 2008/0213662 A1 | 9/2008 | Chiang et al. |
| 2008/0254368 A1 | 10/2008 | Ooyama et al. |
| 2008/0311470 A1 | 12/2008 | Gozdz et al. |
| 2009/0035664 A1 | 2/2009 | Chiang et al. |
| 2009/0202903 A1 | 8/2009 | Chiang et al. |
| 2010/0003603 A1 | 1/2010 | Chiang et al. |
| 2010/0248028 A1 | 9/2010 | Riley, Jr. et al. |
| 2011/0005065 A1 | 1/2011 | Chiang et al. |
| 2011/0027656 A1 | 2/2011 | Chiang et al. |
| 2011/0045346 A1 | 2/2011 | Chiang et al. |
| 2011/0064999 A1 | 3/2011 | Chiang et al. |
| 2011/0070489 A1 | 3/2011 | Chiang et al. |

FOREIGN PATENT DOCUMENTS

| | | | |
|---|---|---|---|
| EP | 1042832 | A1 | 10/2000 |
| EP | 1184918 | A2 | 3/2002 |
| EP | 1231651 | A1 | 8/2002 |
| EP | 1231653 | A1 | 8/2002 |
| EP | 1860722 | A2 | 11/2007 |
| GB | 976971 | A | 12/1964 |
| JP | 5398038 | | 8/1978 |
| JP | 55010738 | A | 1/1980 |
| JP | 59094379 | A | 5/1984 |
| JP | 59152565 | A | 8/1984 |
| JP | 60183365 | A | 9/1985 |
| JP | 61004167 | A | 1/1986 |
| JP | 63121272 | A | 5/1988 |
| JP | 63289768 | A | 11/1988 |
| JP | 0458455 | | 2/1992 |
| JP | 04144073 | A | 5/1992 |
| JP | 05041211 | A | 2/1993 |
| JP | 05109429 | A | 4/1993 |
| JP | 529006 | | 5/1993 |
| JP | 06236768 | A | 8/1994 |
| JP | 07101728 | | 4/1995 |
| JP | 07153492 | A | 6/1995 |
| JP | 07262986 | A | 10/1995 |
| JP | 08138650 | A | 5/1996 |
| JP | 09022693 | | 1/1997 |
| JP | 09147862 | | 6/1997 |
| JP | 09298057 | A | 11/1997 |
| JP | 9320569 | A | 12/1997 |
| JP | 11121006 | A | 4/1999 |
| JP | 11121025 | A | 4/1999 |
| JP | 11121061 | A | 4/1999 |
| JP | 11162519 | A | 6/1999 |
| JP | 2000021415 | A | 1/2000 |
| JP | 2000048639 | A | 2/2000 |
| JP | 2000080406 | A | 3/2000 |
| JP | 2000173645 | A | 6/2000 |
| JP | 2000195525 | A | 7/2000 |
| JP | 2000195526 | | 7/2000 |
| JP | 2000228213 | A | 8/2000 |
| JP | 2000248095 | A | 9/2000 |
| JP | 2000344266 | | 12/2000 |
| JP | 1113511 | A1 | 7/2001 |
| JP | 2002151055 | A | 5/2002 |
| KR | 101991000746 | | 9/1991 |
| WO | WO-9705666 | A2 | 2/1997 |
| WO | WO-9744843 | A1 | 11/1997 |
| WO | WO-9812761 | A1 | 3/1998 |
| WO | WO-9816960 | A2 | 4/1998 |
| WO | WO-9933129 | A1 | 7/1999 |
| WO | WO-9956331 | A1 | 11/1999 |
| WO | WO-0041256 | A1 | 7/2000 |
| WO | WO-0177501 | A2 | 10/2001 |
| WO | WO-0243168 | A2 | 5/2002 |
| WO | WO-03012908 | A2 | 2/2003 |
| WO | WO-03056646 | A1 | 7/2003 |
| WO | WO-2008011061 | A1 | 1/2008 |
| WO | WO-2008153749 | A1 | 12/2008 |

OTHER PUBLICATIONS

Aleshin et al. (1998) "Transport properties of poly (3,4-ethylenedioxythiophene/poly(styrenesulfonate)", Synthetic Metals, 94 pp. 173-177.

Allen, J "Electronically conductive Lithium Iron Phospho-olivines with Improved Electrochemical Performance," The Proceedings of the Electrochemical Society 2003:197-205.

Arbizzani et al, "Li1.01Mn1.974 surface modification by pol(3m4-Ethylenedioxithiophene)," J. Power Sources, 119-121: 695-700.

Armand et al. (1979)"Fast Ion Transport in Solids," Proceedings of the International conference on Fast ion Transport in Solids, Electrodes and Electrolytes, Lake Geneva, Wisconsin, p. 31.

Bouridah et al.(1985) "Poly(Dimethylsiloxane)-Poly(Ethylene Oxide) Based Polyurethane Networks Used as Electrolytes in Lithium Electrochemical Solid State Batteries," Solid State Ionics, 15 pp. 233-240.

Broadhead et al. (1995) "Electrochemical Principles and Reactions", Handbook of Batteries, Ch. 2.

Chiang et al. (1999) High Capacity, Temperature-Stable Lithium Aluminum Manganese Oxide Cathodes for Rechargeable Batteries, Electrochem. Sol. St. Lett. 2(3), pp. 107-110.

Cho, et al. "Self-Assembling Colloidal-Scale Devices: Selectinv and Using Short-Range Surface Forces Between Conductive Solids". Adv. Funct. Matter (2007) 17:379-389.

Elliot "Physics of Amorphous Materials" Longham Group Limited, 1993. 201 Pages.

Ep Appln No. 01 988 312.3 Communication pursuant to Article 96(2) EPC mailed Mar. 9, 2005 (3 pgs).

French (2000) "Origins and Applications of London Dispersion Forces and Hamaker Constants in Ceramics" Journal of the American Ceramic Society, 83[9], 2117-46.

French et al. (1995) "Full Spectral Calculation of Non-Retarded Hamaker Constants for Ceramic Systems from Interband Transition Strengths," Solid State Ionics, 75, pp. 13-33.

Ghosh et al. (1998) "Supramolecular Self-Assembly for Enhanced Conductivity in Conjugated Polymer Blends: Ionic Crosslinking in Blending of Poly(3,4-ethylenedioxythiophene)-Poly(styrenesulfonate) and Poly(vinylpyrrolidone)" Adv. Mater, 10:1097.

Gray (1991) "Solid Polymer Electrolytes: Fundamentals and Technological Applications," VCH, New York.

Hadziioannou "Negative Hamaker Coefficients" Colloid & Polymer Sci., 257, 413-419 (1979) (9 pgs).

Hart et al. (2003) "3-D Microbatteries," Electrochemistry Communications, No. 5, pp. 120-123.

Idota et al. (1997) "Tin-Based Amorphous Oxide: A high Capacity Lithium-Ion-Storage Material" Science, 276,p. 1395.

International Preliminary Examination Report for PCT/US01/48345, mailed Feb. 25, 2004 (7 Pages).

International Search Report, International Patent Application No. PCT/US01/48345, mailed Feb. 20, 2003 (9 Pages).

Kuwabata et al. (1999) "Charge-discharge properties of composites of LiMn2O4 and polypyrrole as positive electrode materials for 4 V class of rechargeable Li Batteries" Electrochimica Acta, 44:4593-4600.

LeCras et al. (1996) "Lithium intercalation in Li-Mg-Mn-O and Li-Al-Mn-O spinels," Solid State Ionics, 89 pp. 203-213.

Limthongkul et al. (2001) "Nanocomposite Li-Ion Battery Anodes Produced by the Partial Reduction of Mixed Oxides," Chem. Mater, 13, pp. 2397-2402.

Linden (1995) "Handbook of Battereis" Second Edition, McGraw-Hill, Inc., p. 2,19.

Long "Three-Dimensional Battery Architectures" Chem. Rev. 104:4463-4492 (2004).

Matsumoto et al. (1992) "Vaporization of Graphite in Plasma Arc and Identification of C60 in Deposit," J. Electrochem. Soc., vol. 139 No. 1.

Milling et al. (1996) "Direct Measurement of Repulsive van der Waals interactions using an Atomic Force Microscope" Journal of Colloid and Interface Science, 180, pp. 460-465.

Minnet et al. (1988), "Polymeric Insertion Electrodes," Solid State Ionics, 28-30 1192-1196.

Nagaoka et al., "High Ionic Conductivity in Poly(dimethyl Siloxane-co-Ethylene Oxide) Dissolving Lithium Perchlorate," Dept of Chemistry, Sophia University, pp. 659-663.

Neumann et al. (1979) "Negative Hamaker Coefficients" Colloid and Polymer Sci., 257, pp. 413-419.

Ohzuku et al. (1995) Synthesis and Characterization of LiAL1/4Ni3/4O2 for Lithium-Ion (Shuttle Cock) Batteries, J. Electrochem. Soc., vol. 143, p. 4033.

U.S. Office Action mailed Apr. 4, 2008 for U.S. Appl. No. 10/628,681. 8 pages.

U.S. Office Action mailed Dec. 3, 2009 for U.S. Appl. No. 10/628,681. 10 pages.

U.S. Office Action mailed Dec. 4, 2008 for U.S. Appl. No. 10/628,681. 9 pages.

U.S. Office Action mailed Jan. 25, 2007 for U.S. Office Action U.S. Appl. No. 10/628,681. 9 pages.

U.S. Office Action mailed May 11, 2006 for U.S. Appl. No. 10/628,681. 5 pages.

U.S. Office Action mailed May 12, 2009 for U.S. Appl. No. 10/628,681. 10 pages.
U.S. Office Action mailed Oct. 4, 2007 for U.S. Appl. No. 10/628,681. 8 pages.
Van Oss et al. (1977) "Comparison Between Antigen-Antibody Binding Energies". Imunnunol. Comm., 6(4), pp. 341-354.
Van Oss et al. (1979) "Repulsive Van Der Waals Faces" Imunnunol. Comm., (8)1, pp. 11-29.
Van Oss et al. (1979) "Repulsive van der Waals Forces" Separation Sci. Tech. 14(4), pp. 305-317.
Van Oss et al. (1980) "Applications of Net Repulsive Van der Waals forces between different particles, macromolecules or biological cells in liquids" Colloids and Surfaces, 1, pp. 45-56.
Wang et al. (2002) "All Solid State Ll/LixMnO2 Polymer Battery Using Ceramic Modified Polymer Electrolytes", Journal of Electrochem. Soc. 149 (8), A967.
Written Opinion for PCT/US01/48345, mailed Aug. 22, 2003 (7 Pages).
Zallen, (1983) "The Physics of Amorphous Materials," J. Wiley & Sons, N.Y.
U.S. Appl. No. 10/206,887.
U.S. Appl. No. 12/886,066, Viola, et al.
WO-PCT/US2002/23881, Massachusetts Inst Technology.
Arbizzani, et al., "$Li_{1.03}Mn_{1.97}O_4$ Surface Modification by Poly(3,4-ethylenedioxithiophene)", Poster Presented at the 11th International Meeting on Lithium Batteries, Monterey, California, Jun. 23-28, 2002, 1 page.
Armand, et al., "Poly-Ethers as Solid Electrolytes", Fast Ion Transport in Solids: Electrodes and Electrolytes, Proceedings of the Intenational Conference on Fast Ion Transport in Solids, Electrodes and Electrolytes, Lake Geneva, Wisconsin, May 21-25, 1979, 7 pages.
Atomized, Merriam-Webster Online, 2 pages. Accessed Jul. 26, 2010.
Cantilever, Merriam-Webster Online, 2 pages. Accessed Jul. 19, 2010.
Chen et al. Reducing Carbon in LiFePO4/C Composite Electrodes to Maximize Specific Energy, Volumetric Energy, and Tap Density. J Electrochem Soc. 2002;148(9) A1184-89.
Compliant, Merriam-Webster Online, 2 pages. Accessed Jul. 16, 2010.
Dimension, Merriam-Webster Online, 2 pages. Accessed Jul. 14, 2010.
Displacement, Merriam-Webster Online, 2 pages. Accessed Jul. 16, 2010.
Ehrlich, "Chapter 35: Lithium-Ion Batteries", p. 35.1, (2002), 1 page.
Gaubicher, et al., "Li/β-$VOPO_4$: A New 4 V System for Lithium Batteries", Journal of the Electrochemical Society, 146(12):4375-4379 (1999).
Hermetic, Merriam-Webster Online, 2 pages. Accessed Jul. 19, 2010.
Huang,et all., "Approaching Theoretical Capacity of $LiFePO_4$ at Room Temperature at High Rates", Electrochemical and Solid-State Letters, 4(10):A170-A172 (2001).
Infuse, Merriam Webster Online, 2 pages. Accessed Jul. 19, 2010.
Interface, Merriam-Webster Online, 2 pages. Accessed Jul. 15, 2010.
International Preliminary Examination Report for PCT/US02/23880 mailed Mar. 14, 2007. 3 pages.
International Preliminary Report on Patentability for PCT/US2008/006604 mailed Dec. 10, 2009. 15 pages.
International Search Report for PCT/US2008/06604 mailed Nov. 3, 2008. 8 pages.
International Search Report for PCT/US2009/000901 mailed Sep. 11, 2009. 3 pages.
International Search Report for US090/006284 mailed Jun. 7, 2010. 7 pages.
Intervening, Merriam-Webster Online, 2 pages. Accessed Jul. 19, 2010.

Li, et al., "Mixed (Electronic and Ionic) Conductive Solid Polymer Matrix, 1: Synthesis and Properties of poly(2,5,8,11,14,17,20,23-octaoxa-pentacosyl methacrylate)-*block*-poly(4-vinylpyridine)", Makromol. Chem., 192:3043-3050 (1991).
Matsumoto, et al., "Ionic Conductivity of Dual-Phase Polymer Electrolytes Compriesd of NBR/SBR Latex Films Swollen with Lithium Salt Solutions", Technical Papers: Electrochemical Science and Technology, J. Electrochem. Soc., 141(8):1989-1993 (1994), 7 pages.
Mazouzi, et al., "High Capacity and Excellent Cyclability of Nano-Silicon/CB/CMC Composite Anode from Tailored Electrode Prepararatin", 26th Electrochemical Society Meeting, Abstract 417 (2009), 1 page.
Open-Cell Foam, McGraw-Hill Dictionary of Scientific and Technical Terms, (1974), 3 pages.
Padhi, et al., "Phospho-olivines as Positive-Electrode Materials for Rechargeable Lithium Batteries", J. Electrochem. Soc., 141(4):1187-1194 (1997).
Percolating, Merriam-Webster Online, 2 pages, Accessed Jul. 16, 2010.
Pierson, "Chapter 6: Vitreous Carbon", Handbook of Carbon, Graphite, Diamond and Fullernes—Properties, Processing and Applications, William Andrew Publishing, pp. 122-140 (1993), 20 pages.
Polymerization, Merriam-Webster Online, 2 pages. Accessed Jul. 16, 2010.
Ravet et al. Electroactivity of Natural and Synthetic Triphylite. J Power Sci. 2001 97-98; 503-507.
Ravet. et al, "Improved Iron Based Cathode Material", Abstract No. 127 1 page.
Reed, *Introduction to the Principles of Ceramic Processing*, John Wiley & Sons, Inc., pp. 86-89 (1988).
Rheological, Merriam-Webster Online, 2 pages. Accessed Jul. 26, 2010.
Settle, Merriam-Webster Online, 2 pages. Accessed Jul. 19, 2010.
Tarascon, et al,. "Issues and Challenges Facing rechargeable Lithium Batteries", Nature, 415:359-367, (2001).
Thermoplastic, Merriam-Webster Online, 2 pages. Accessed Jul. 26, 2010.
Tukamoto, et al., "Electronic Conductivity of $LiCoO_2$ and Its Enhancement by Magnesium Doping", Technical Papers: Solid-State Science and Technology, J. Electrochem. Soc., 144(9):3164-3168 (1997).
U.S. Office Action mailed Aug. 7, 2006, for U.S. Appl. No. 10/206,662 (7 pages).
U.S. Office Action mailed Feb. 2, 2011, for U.S. Appl. No. 12/512,421. 6 pages.
U.S. Office Action mailed May 17, 2010, for U.S. Appl. No. 12/512,421. 8 pages.
U.S. Office Action mailed May 19, 2005, for U.S. Appl. No. 10/206,662. 6 pages.
U.S. Office Action mailed May 8, 2007, for U.S. Appl. No. 10/206,662 (8 pages).
U.S. Office Action mailed Oct. 22, 2010, for U.S. Appl. No. 12/512,421. 6 pages.
Viscosity. Merriam Webster Dictionary. 2 pages. Accessed Jul. 15, 2010.
Written Opinion for PCT/US2008/006604 mailed Nov. 3, 2008. 14 pages.
Yamada, et al., "Optimized $LiFePO_4$ for Lithium Battery Cathodes", Journal of the Electrochemical Society, 148(3):A224-A229 (2001).
Yamada, et al., 'Crystal Chemistry of the Olivine-Type Li($Mn_y$ $Fe_{1-y}$)$PO_4$ and ($MN_y Fe_{1-y}$) $PO_4$ as Possible 4 V Cathode Materials for Lithium Batteries, Journal of the Electrochemical Society, 148(8):A960-A967 (2001).

* cited by examiner

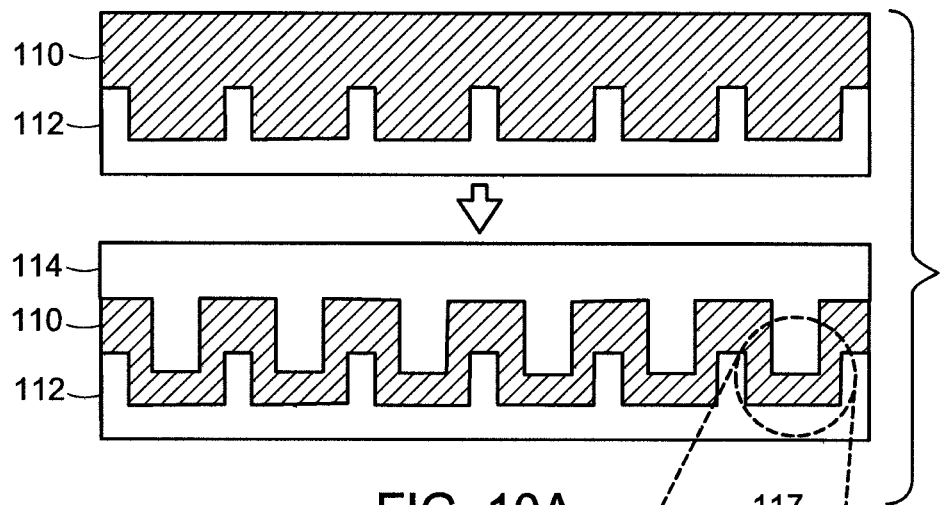
FIG. 10A
FIG. 10A-1
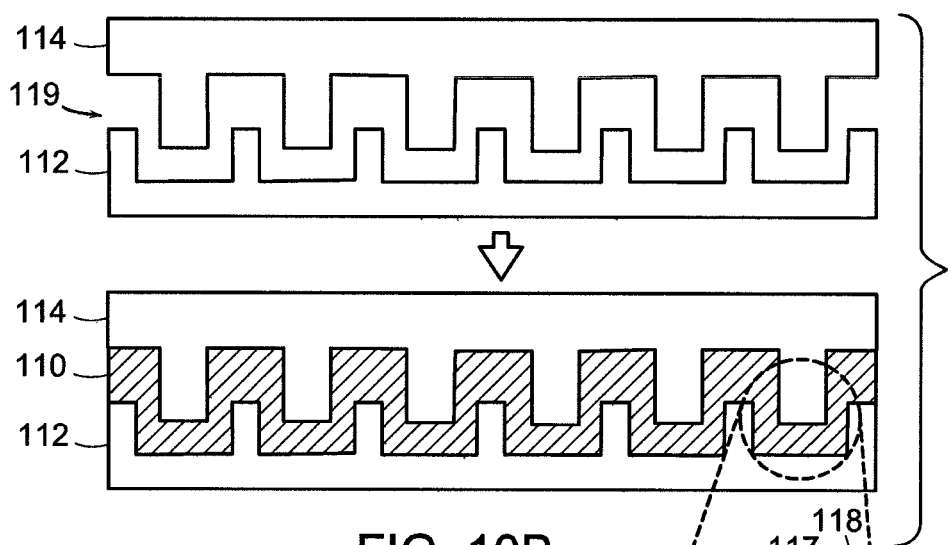
FIG. 10B
FIG. 10B-1

BIPOLAR ARTICLES AND RELATED METHODS

CROSS-REFERENCE TO RELATED APPLICATIONS

This application is a continuation of U.S. application Ser. No. 10/628,681 filed on Jul. 28, 2003 which claims priority to U.S. Provisional Application Nos. 60/398,902 and 60/399,050, both filed on Jul. 26, 2002, which are herein incorporated by reference in their entirety.

BACKGROUND OF THE INVENTION

1. Field of the Invention

The invention relates generally to bipolar articles, such as batteries, and in particular to bipolar articles having interpenetrating current collectors and/or arbitrary form factors that are useful, e.g., for integral formation or embedding in various electronic devices.

2. Summary of the Related Art

Batteries, and particularly rechargeable batteries, are widely used in a variety of devices such as cellular telephones, laptop computers, personal digital assistants, and toys. One example of a rechargeable battery is a lithium solid polymer electrolyte rechargeable battery. This battery can be charged by applying a voltage between the battery's electrodes, which causes lithium ions and electrons to be withdrawn from lithium hosts at the battery's cathode. Lithium ions flow from the cathode to the battery's anode through a polymer electrolyte, and are reduced at the anode, with the overall process requiring energy. Upon discharge, the reverse occurs: lithium ions and electrons are allowed to re-enter lithium hosts at the cathode, while lithium is oxidized to lithium ions at the anode. This is an energetically favorable process that drives electrons through an external circuit, thereby supplying electrical power to a device to which the battery is connected.

Currently available batteries typically have a layered design. Manufacturing constraints generally limit the available shapes or form factors of these batteries. Common form factors include cylinders, button cells (thin discs), relatively thick (>3 mm) prismatic forms, and relatively thin (<0.5 mm) prismatic forms. The relatively thick prismatic forms typically are made by rolling and pressing long coated cathode and anode electrode assemblies separated by a thin separator, or by stacking or laminating layers of cathode/electrolyte/anode material. Some of these prismatic forms are made using a jelly roll or pressed cylinder process. The relatively thin (<0.1 mm) prismatic forms are generally made using thin film processes such as physical vapor deposition.

The energy density of these currently available batteries is relatively low, due to poor volumetric utilization of space within devices in which the batteries are used. For example, short diffusion distances are required for lithium ion transport in a lithium battery. Therefore, the distances between current collectors in a multi-laminate battery structure is small, e.g., less than about 250 µm. The large number of current collectors reduces the volume and weight fractions of electroactive material in the battery. In addition, extra components generally are needed in the devices in which the batteries are used, in order to allow the batteries to be inserted and connected. Such components include an internal chamber with suitable fit and finish for consumer use, an extra set of interconnects to attach the battery to the device, and additional parts to allow the battery to be exchanged, such as, e.g., a battery cover.

Therefore, a need exists for alternative battery designs that allow for more efficient use of space within electronic devices, and thus provide improved power and energy densities.

Recently "three-dimensional batteries" have been proposed, which have anodes and cathodes with active surface areas exposed in three dimensions. Such structures potentially can improve upon the results obtained using standard battery geometries by allowing for more optimal use of materials through independent variation of the ionic and electronic transport path lengths within the device. The present invention provides advances within the emerging field of three-dimensional batteries.

SUMMARY OF THE INVENTION

The present invention provides bipolar articles (i.e., articles such as batteries and capacitors that have two poles, one positive and one negative, that are electrically insulated from one another) having new architectures, such as interpenetrating anode and cathode structures, allowing for improved energy density, and arbitrary form factors, allowing for formation in substantially any desired shape. Such articles are useful for embedding or integral formation in various electronic devices to provide more efficient use of space in the devices. Some of the bipolar articles provided include self-organizing bipolar structures, or sequentially assembled structures. Methods of making and using the articles are also provided.

Accordingly, in one aspect, the invention provides a bipolar article having an arbitrary form factor. The article includes a bipolar structure having an anode, a cathode, and an electrolyte in contact with and separating the anode and cathode. The anode and cathode are interpenetrating. The article further includes a cathode current collector that is in electronic communication with the cathode, and an anode current collector that is in electronic communication with the anode. The bipolar article has a desired arbitrary configuration. The terms "arbitrary form factor" and "arbitrary configuration," as used herein with respect to a bipolar article as a whole, refer to a bipolar article having an overall form that is not cylindrical or prismatic. "Prismatic" refers to a square or rectangular block having equal thickness across its length and width. In certain embodiments, a bipolar article of arbitrary form factor has a thickness that varies across the length and/or width of the article. In certain embodiments, a bipolar article of arbitrary form factor has a thickness that varies over a length scale that is independent of any length scale of the internal electrode structure of the article. In some instances, a bipolar article of arbitrary form factor takes on the form of a device or housing in which it is contained, or some other conformal or complex shape, for example, a shape including non-planar surfaces.

In another aspect, the invention provides a battery powered device including an interpenetrating electrode battery, which, in some instances, is a self-organizing battery, a housing, and a mechanism powered by the battery. The battery is integrated in the housing or formed in a cavity in the housing. In this context, "integrated" means that the battery is substantially space-filling within the housing. Particularly useful batteries are space-filling in a form factor that is neither cylindrical nor prismatic.

Still another aspect of the invention provides a bipolar article containing first and second interpenetrating electrodes and a plurality of first interpenetrating current collector features wired in parallel and in electronic communication with the first interpenetrating electrode. The article further contains a second current collector in electronic communication with the second interpenetrating electrode. The plurality of first interpenetrating current collector features is distributed through the thickness of the article. In some embodiments, the current collector features are spaced apart at distances and in locations chosen to maximize power density. In certain embodiments, the current collector features are spaced apart at distances and in locations chosen to maximize energy density. For example, in a lithium ion (Li-ion) battery, adjacent current collector features are spaced apart at a distance greater than about 500 µm, in some instances greater than about 750 µm, or greater than about 1000 µm.

Another aspect of the invention provides a multi-layered Li-ion battery having an energy density greater than about 212 Wh/kg.

Still another aspect of the invention provides a bipolar article including a bipolar structure having an anode, a cathode, and an electrolyte in contact with and separating the anode and the cathode. At least one of the anode and the cathode includes a lithium-containing electroactive material. The article further includes a cathode current collector that is in electronic communication with the cathode, and an anode current collector that is in electronic communication with the anode. At least one of the anode and cathode current collectors includes one or more features projecting into the bipolar structure containing the anode and the cathode. The minimum distance between adjacent current collectors is at least about 500 µm, in some instances at least about 750 µm, and in certain instances at least about 1000 µm.

Another aspect of the invention provides a bipolar article including a bipolar structure having an anode network and a cathode network, a cathode current collector that is attractive to the cathode network and repulsive to the anode network, and an anode current collector that is attractive to the anode network and repulsive to the cathode network. At least one of the anode and cathode current collectors is structured and arranged to reduce the effective thickness of the respective network attracted thereto. The effective thickness is reduced by interweaving the current collector through the bipolar article in such a way that the electrical path length within the network is less than it would be if the current collector were not there. The location of the current collector balances the electrical and ionic conductivities of the system, as described in more detail below.

Yet another aspect of the invention provides a bipolar article including a porous first electrode and at least one first current collector, at least a portion of which is embedded within and in electronic communication with the porous first electrode. An electronically insulating, ionically conductive material coats the pore structure of the porous first electrode. Within the pores of the coated porous first electrode is a second electrode having opposite polarity to the porous first electrode. A second current collector is in electronic communication with the second electrode.

In still another aspect, the invention provides a method of making a bipolar article having an arbitrary form factor. The method includes providing a first current collector in a mold having a configuration corresponding to the desired arbitrary form factor, and depositing on the first current collector a first electrode material, an electrolyte material, and a second electrode material. At least one of the electrode materials is configured to have one or more features projecting into the electrolyte material and the other electrode material. A second current collector is provided on the first electrode, electrolyte, and second electrode materials.

Another aspect of the invention provides a method of making a bipolar article having an arbitrary form factor, in which the arbitrary form factor includes a thickness that varies across the length or width of the article. The method includes providing a first current collector in a mold having a configuration corresponding to the desired arbitrary form factor, and depositing on the first current collector a first electrode material, an electrolyte material, and a second electrode material. A second current collector is provided on the first electrode material, electrolyte material, and second electrode material. The method produces a bipolar article having a thickness that varies across the length or width of the article.

Still another aspect of the invention provides a method of making a layered interpenetrating bipolar article. The method includes providing a first current collector and depositing on the first current collector an electrode region. The electrode region contains an interpenetrating network including an anode material, an electrolyte material, and a cathode material. A second current collector is provided on the electrode region. The foregoing method steps are repeated at least once. The method further includes electrically connecting the first current collectors with each other and with one of the anode or cathode materials, and electrically connecting the second current collectors with each other and with the other of the anode or cathode materials.

In yet another aspect, the invention provides a method of making an interpenetrating bipolar article. The method includes providing a first current collector having at least one prong, and depositing on the first current collector an electrode region. The electrode region contains an interpenetrating network including an anode material, an electrolyte material, and a cathode material. The prong of the first current collector extends into one of the anode and cathode materials. A second current collector is provided on the electrode region.

Another aspect of the invention provides a method of making an interpenetrating bipolar article. The method includes assembling a mold containing a first current collector and suspending a plurality of second current collector mesh layers above the first current collector in the mold. A self-organizing bipolar material is introduced into the mold, so that the first and second current collectors are covered with the self-organizing bipolar material. The self-organizing bipolar material is cured to form interpenetrating anode and cathode networks separated by an intervening electrolyte. One of the anode and cathode networks is attractive to the first current collector and repulsive to the second current collector, and the other of the anode and cathode networks is attractive to the second current collector and repulsive to the first current collector.

BRIEF DESCRIPTION OF THE DRAWINGS

The invention is described with reference to the following figures, which are presented for the purpose of illustration only and which are not intended to be limiting of the invention.

FIGS. 10A-B are schematic illustrations of methods for making a self-organizing battery with interpenetrating current collectors according to certain embodiments of the invention.

DETAILED DESCRIPTION

In general, factors associated with optimizing both energy and power densities in bipolar articles include (1) having a balanced cell with equal capacities of the anode and cathode, (2) having a maximum amount of active material (anode and cathode) in relation to electrolyte and packaging, (3) establishing a minimum distance between the anode and cathode, and (4) establishing a maximum electrical conductivity within the anode and cathode network. In the past, attempts to increase the energy capacity of a battery by increasing battery thickness and electrode size have not been fully successful, because they often result in reduced in power density. This is due to an imbalance that occurs between the electronic and ionic conductivities in the battery system, because (i) the electronic conductivity decreases with the increasing bulk of the electrode, and (ii) the ionic conductivity decreases across the electrode/electrolyte/electrode stack.

Traditional two-dimensional battery geometries (without interpenetrating electrodes) are inherently unbalanced because ions (e.g. Li$^+$) and electrons flow in parallel directions, such that their transport path lengths within the device cannot be independently adjusted. Such a design does not allow for optimal use of materials, and generally results in an ionic transport path length that is longer than desired, and excess electronic conductivity in one or both electrodes. In contrast, in "three dimensional batteries" having interpenetrating electrodes with active surface areas exposed in three dimensions, the directions of ion and electron flow are decoupled and can be adjusted independently. This allows for better balancing of cell parameters by more optimal use of materials, ultimately leading to improved cell performance.

Figure 1:
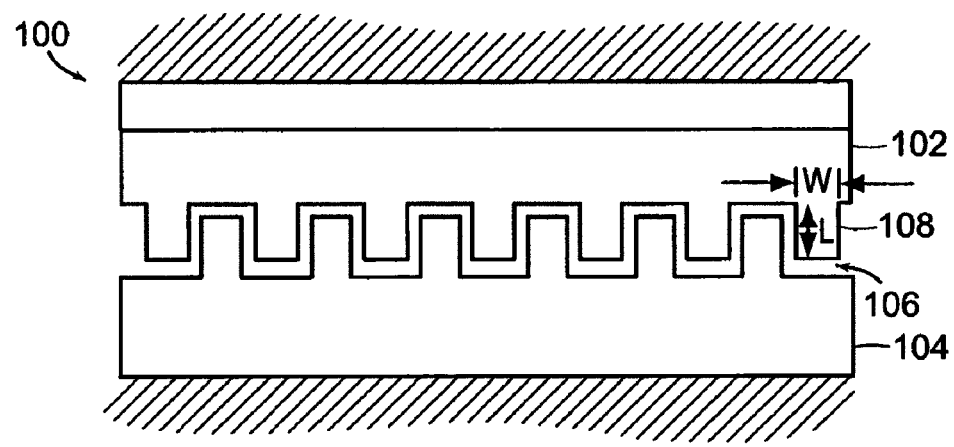
FIG. 1 is a schematic illustration of an exemplary cell having interpenetrating electrodes.

FIG. 1 illustrates an exemplary cell 100 having interpenetrating anodes and cathodes. For example, in a lithium ion system, the following relationship provides a balance of the two cell properties, electronic conductivity and ionic conductivity:

$$\sigma_e \sim 1/(w^2/\sigma_{Li}^s/l^2 + w*a/\sigma_{Li}^e/l^2) \quad (1)$$

where $\sigma_e$ is the electronic conductivity of the cathode 102 and anode 104 electrodes in an interpenetrating system, $\sigma_{Li}^s$ is the ionic conductivity of lithium through the cathode 102 and anode 104 electrodes, $\sigma_{Li}^e$ is the ionic conductivity of lithium through the electrolyte 106, l is the length of the electrode extension 108, a is the electrolyte thickness, and w is the width of the electrode extension 108. One of skill in the art will appreciate that Equation (1) can be modified accordingly if the ionic conductivity of lithium is different through the cathode 102 and the anode 104. Thus, higher electrode electrical conductivities are necessary for larger lengths of electrode extension. Accordingly, increasing the thickness of a battery structure to increase the energy capacity often is not feasible, because the resulting increased electrode thickness increases impedance and lowers power density, and the electrical conductivity of the electrodes is not sufficient to allow high power densities.

Three-dimensional designs can be enhanced by spacing current collectors throughout the cell to balance the ionic and electronic conductivities, while minimizing the total current collector volume. The spacing between current collectors in a three-dimensional design can be greater than is possible for a traditional two-dimensional design, because current collector placement is no longer dictated by ionic conductivity (i.e., the ionic and electronic transport paths are decoupled). Thus, the interpenetrating electrode structure of the three-dimensional design provides greater power at any given current collector spacing. For example, a three-dimensional lithium ion battery of reasonable power can be provided with distances between adjacent current collectors of greater than 500 µm, and in some instances greater than 750 µm, or greater than 1000 µm. In comparison, one of skill in the art will appreciate that the current collector spacing in a two-dimensional lithium ion battery of comparable or lower power is generally no more than about 200 µm to about 250 µm. Three-dimensional designs also provide higher energy at a given power compared to two-dimensional designs. By allowing for increased thickness with a reduced number of current collectors, an interpenetrating electrode battery provides equivalent power and higher energy density compared to a standard geometry battery of the same size.

By way of example, a thick (e.g., greater than about 1 mm in thickness) interpenetrating electrode electrochemical cell is provided with multiple current collectors that are wired in parallel and distributed throughout the thickness of the battery. In general, the energy density of a desirable cell is maximized for a specified rate capability. Because current collectors occupy space within the electrode assembly, in at least some instances it is desirable to reduce the number of layers within the cell. However the rate capability of a cell is inversely proportional to its impedance or resistance. As a result, in at least some instances an optimized cell is one in which the number of layers is minimized for a specified rate capability. In addition, the cycle life of a battery tends to be degraded if it is used at a rate capability significantly above its design limit.

In an exemplary cell, the number of layers in the cell and the spacing between current collectors are chosen to satisfy the design parameters described above with respect to Equation 1. The resistance of interpenetrating cells in the battery is modeled as a network of resistors. In general, there are two cases for such layered cells: symmetric, in which each layer is uniquely served by a single pair of current collectors; and asymmetric, in which, for example, each layer is served by a single cathode current collector, but multiple layers are served by a single anode collector. A symmetric design generally is suitable for cathode and anode networks with similar levels of resistivity, whereas asymmetric designs generally are more applicable for cathode and anode networks with a large difference in resistivity. The model presented in this example is for symmetric designs, although alternative embodiments having asymmetric designs are also contemplated. The general relationship for the resistance of the cell is as follows:

$$R_{cell} = \frac{R_{layer}}{n} \quad (2)$$

where $R_{layer}$ is the resistance of the layer and n is the number of layers in the cell. In this example, $R_{layer}$ is represented by the following relationship:

$$R_{layer} = R_{ccc} + R_{cccc} + R_{cn} + R_{electrolyte} + R_{an} + R_{acc}, \quad (3)$$

where $R_{ccc}$ and $R_{acc}$ are the electrical resistances of the cathode and anode current collectors (CC), respectively, $R_{cccc}$ is the resistance of the cathode current collector coating, $R_{cn}$ and $R_{an}$ are the electrical resistances of the cathode and anode networks, respectively, and $R_{electrolyte}$ is the ionic resistance of the electrolyte layer. A specific example of such a cell is set forth in detail in Example 1 below.

In general, because the electronic and ionic conductances are balanced in a three-dimensional battery with interpenetrating current collectors, the energy density of such a battery is greater than that of a corresponding two-dimensional battery. In some instances, energy density performance advantages are in the range of about 10%, about 25%, or about 50%. For example, compared to a two-dimensional Li-ion battery providing an energy density of about 170 Wh/kg, a three-dimensional Li-ion battery providing a performance advantage of about 25% would have an energy density of about 212.5 Wh/kg.

Arbitrary Form Factors

In some embodiments, the present invention provides a bipolar article constructed to have virtually any desired form factor or shape. In certain embodiments, bipolar articles having arbitrary form factors are embedded in various devices such as, e.g., cellular telephones, personal digital assistants, laptop computers, and the like, or are integrated into a portion, e.g., a wall of a device. The efficient use of space arising from arbitrary form factors provides for greater practical energy densities. Furthermore, bipolar articles having arbitrary form factors advantageously allow for a reduced number of parts in devices in which they are used, thereby simplifying the design and reducing the cost of the devices. Relatively time-efficient and inexpensive methods of making the bipolar articles described herein are also provided. Some particularly useful bipolar articles include self-organizing structures.

Figure 2:
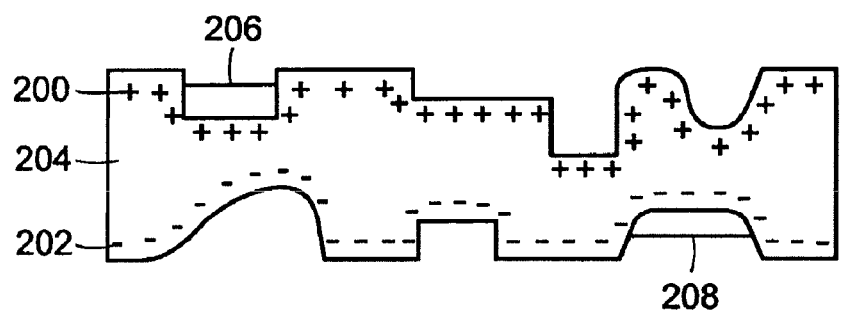
FIG. 2 is a schematic illustration of a self-organizing battery structure having an arbitrary form factor according to certain embodiments of the invention.

FIG. 2 illustrates one non-limiting example of a battery with arbitrary form factor. The battery includes cathode and anode networks 200, 202 separated by an electrolyte 204. Although not shown in the figure, in some embodiments, the networks 200, 202 are self-organizing and/or have an interpenetrating structure. In certain embodiments, the cathode and anode are sequentially assembled. The cathode and anode networks 200, 202 are connected to respective cathode and anode current collectors 206, 208.

Figure 3:
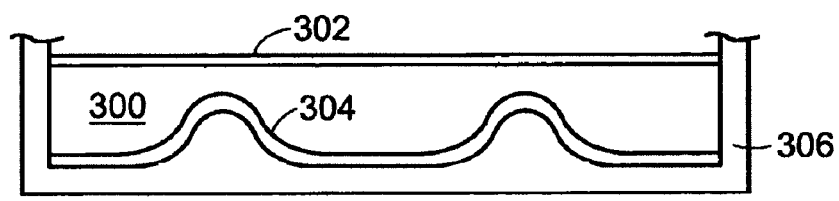
FIG. 3 is a schematic illustration of a battery structure embedded in a device according to certain embodiments of the invention.

FIG. 3 illustrates an example of a bipolar article of arbitrary form factor that is embedded in a device. In the illustrated embodiment, a battery 300 and associated current collectors 302, 304 are embedded in a device housing 306, effectively using available space in the device. As another non-limiting example, a very thin battery (e.g., about 1 mm thick) is embedded in the housing of a laptop computer behind the LCD display. Such a battery extending to the full screen size of a typical display provides an energy density of about 600 Wh/l and a capacity of about 43 Wh. In alternative embodiments, batteries are embedded or integrally formed in other spaces in laptops or other devices, such as, e.g., circuit boards or electronic components, such as DRAM chips.

In certain embodiments, a battery or other bipolar article of arbitrary form factor is produced using techniques such as, for example, coating, stamping, embossing, printing, or injection molding. One non-limiting example of a method for making a bipolar article of arbitrary form factor employs a direct writing process to build up layers with an arbitrary surface topology. For example, a battery is made by depositing individual particles of anode, cathode, and electrolyte with a predetermined length, width and height onto an appropriate substrate. Layers are built up sequentially until the desired overall thickness of the battery is achieved. The battery is constructed so that (i) the cathode particles are interconnected to the cathode current collector, (ii) the anode particles are interconnected to the anode current collector, and (iii) the electrolyte separates the anode and cathode particles. Non-limiting examples of useful processes for forming the layers of the device include ink jet printing, laser induced forward transfer, matrix-assisted pulsed laser evaporation, and photolithographic techniques.

Multilayer coatings are well known in the manufacture of photographic films, with some film structures including as many as 15 distinct layers. Such films are often manufactured using a coating process known as simultaneous multilayer coating. In this process, multiple liquid layers are simultaneously extruded from a slot coating head with multiple dies onto an inclined plane and then onto a moving web. Intermixing between layers does not occur when the liquids are sufficiently viscous that their flow through the die slot and onto the inclined plane is of low Reynolds number (i.e., laminar flow). In some embodiments, a similar approach is used to make a bipolar article of arbitrary form factor. For example, a 3-die slot head is employed, in which the lowest slot extrudes a cathode electrode slurry, the intermediate slot extrudes a separator/electrolyte, and the upper slot extrudes an anode slurry. Using cathode, anode, and separator/electrolyte materials known in the art, a thin film battery is prepared in a single pass by coating cathode, separator/electrolyte, and anode layers onto a cathode current collector that has the desired arbitrary shape, and laminating the dried coating to an anode current collector. In certain embodiments, repulsive forces between the anode and cathode particles ensure that the coating operation, drying, and subsequent lamination result in a thin film structure with no shorting, e.g., as described in more detail below.

Interpenetrating Current Collector Structures

In some embodiments, the present invention provides bipolar articles having geometries that reduce the electron transport pathway to the current collector within an electrode, thereby increasing the electronic conductivity of the system and allowing the use of thicker batteries (e.g., greater than about 0.1 mm) without loss of power density (e.g., power density greater than 300 W/kg and energy density greater than 450 Wh/l). For example, certain embodiments provide thick batteries with interpenetrating current collectors that have sufficient conductivity for high power density. For a constant footprint, increasing the thickness of a battery increases its energy capacity, making it more suitable for a wide range of applications. Moreover, bipolar devices with new architectures as described herein provide for high energy and power density in a high capacity battery with relatively thin electrode layers, thus avoiding the problems (e.g., long drying time) associated with thick, difficult to process electrode layers.

Figure 7:
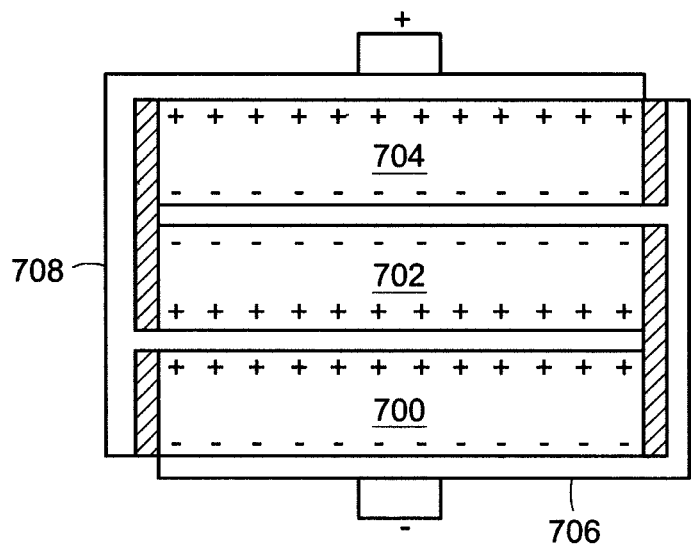
FIG. 7 is a schematic illustration of a multi-layered battery structure according to certain embodiments of the invention.
Figure 9:
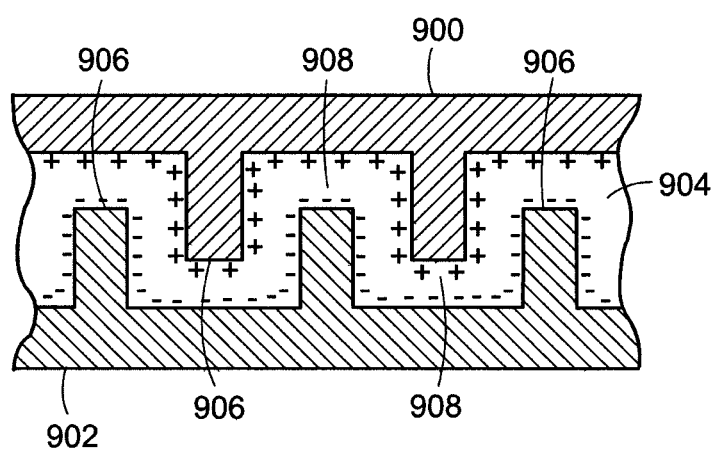
FIG. 9 is a schematic illustration of a battery structure with interpenetrating current collectors according to certain embodiments of the invention.

In some embodiments, the desired reduced electron transport path length is achieved via a bipolar article with interpenetrating current collectors. The interpenetrating structure of the current collectors (particularly the cathode current collector) increases their conductivity, because the distance of electron transport through the relatively resistive electrode is reduced, thus allowing for thick battery structures. The term "interpenetrating current collector" as used herein, refers to a current collector that extends some distance into one or more electrodes or electrode cells. The term "electrode cell" refers to an anode and cathode separated by an electrolyte. FIG. 7 illustrates an example of a structure having interpenetrating current collectors extending into a plurality of electrode cells. FIG. 9 illustrates an example of a structure having interpenetrating current collectors extending into electrodes.

Interpenetrating current collectors are provided using various geometries, for example, a current collector that projects into the electrode or is interdigitated in two or three dimensions with the other current collector (with intervening electrodes and electrolyte). In some embodiments, a reduced transport path length is achieved by use of an interpenetrating current collector that projects into the body of the corresponding electrode. The term "project," as used herein with respect to current collectors, means that the current collector extends a distance outward from a plane defining the current collector and into the corresponding electrode.

In certain embodiments, a reduced diffusion path length is achieved using a bipolar device, e.g., a battery, with stacked electrode layers with alternating anode and cathode orientations, and multiple surfaces of the current collectors in contact with the electrodes. These and other beneficial alternative structures with interpenetrating current collectors are described in more detail below. Further non-limiting examples of useful geometries for interpenetrating current collectors are as described in the following paragraphs for interpenetrating electrodes.

In at least some embodiments, interpenetrating electrodes are used, which decrease the ionic transport distances between electrodes in a device. Interpenetrating electrodes are described in detail in international patent application PCT/US02/23880, published as WO 03/012908, which is incorporated by reference herein. The term "interpenetrating electrodes," as used herein, refers to first and second electrodes configured such that that each electrode forms a network that is continuous in two or three dimensions, and each electrode extends into the other electrode to a distance greater than the smallest lateral dimension of the entities comprising the networks. By way of non-limiting example, in various embodiments, the two electrodes exhibit complementary geometries that form interlocking, infused, or interdigitated structures, or one electrode material permeates into voids or spaces in the other electrode material. In some embodiments, the nature of the interpenetration is such that the network provides multiple pathways to the current collector. In one class of interpenetrating structures, separation without a change in the shape or connectivity of an electrode is prevented by the topology of the interpenetrating network.

Due to their interpenetrating features, the two electrodes of the bipolar device approach one another very closely, while maintaining a large interfacial area and decreasing the required volume of electrolyte. In some instances, the average thickness of the layer of electrolyte or separator between the electrodes is less than about 100 μm, e.g., as low as about 1 μm. In certain embodiments, the interpenetrating features of the electrodes have an average protrusion length (corresponding to length l in FIG. 1) of about 10 μm to about 5,000 μm. Such designs decrease the volume of the system by reducing the volume that would normally be consumed by the separator, electrolyte, binder, conductive additive, and other inert components that, in some embodiments, do not store lithium.

By reducing the ionic transport distance between electrodes and permitting independent variation of the electronic and ionic transport path lengths within a battery, interpenetrating electrode structures provide similar power with larger spaces between current collectors compared to typical battery geometries. The use of fewer, more widely spaced current collectors in interpenetrating electrode batteries leaves more room for electroactive material within a battery of a given volume, therefore providing a higher energy density than a standard battery of the same size.

Self-Organizing Systems

Some particularly useful bipolar devices having interpenetrating current collectors, arbitrary form factors, or both, include self-organizing systems. Such systems are described, for example, in U.S. patent application Ser. No. 10/206,662, entitled "Battery Structures, Self-Organizing Structures and Related Methods," filed on Jun. 26, 2002, which is incorporated by reference herein. That application describes the use of various self-organizing structures to form bipolar devices (e.g., batteries), particularly those having interpenetrating cathode and anode networks. Briefly, as described in that application, self-organizing systems used to form batteries and other bipolar devices contain materials that exert attracting and repelling forces to produce interpenetrating self-organizing structures. The same principle of mutually repulsive and self-attractive surfaces is useful to organize a bipolar device on a current collector.

Figure 4:
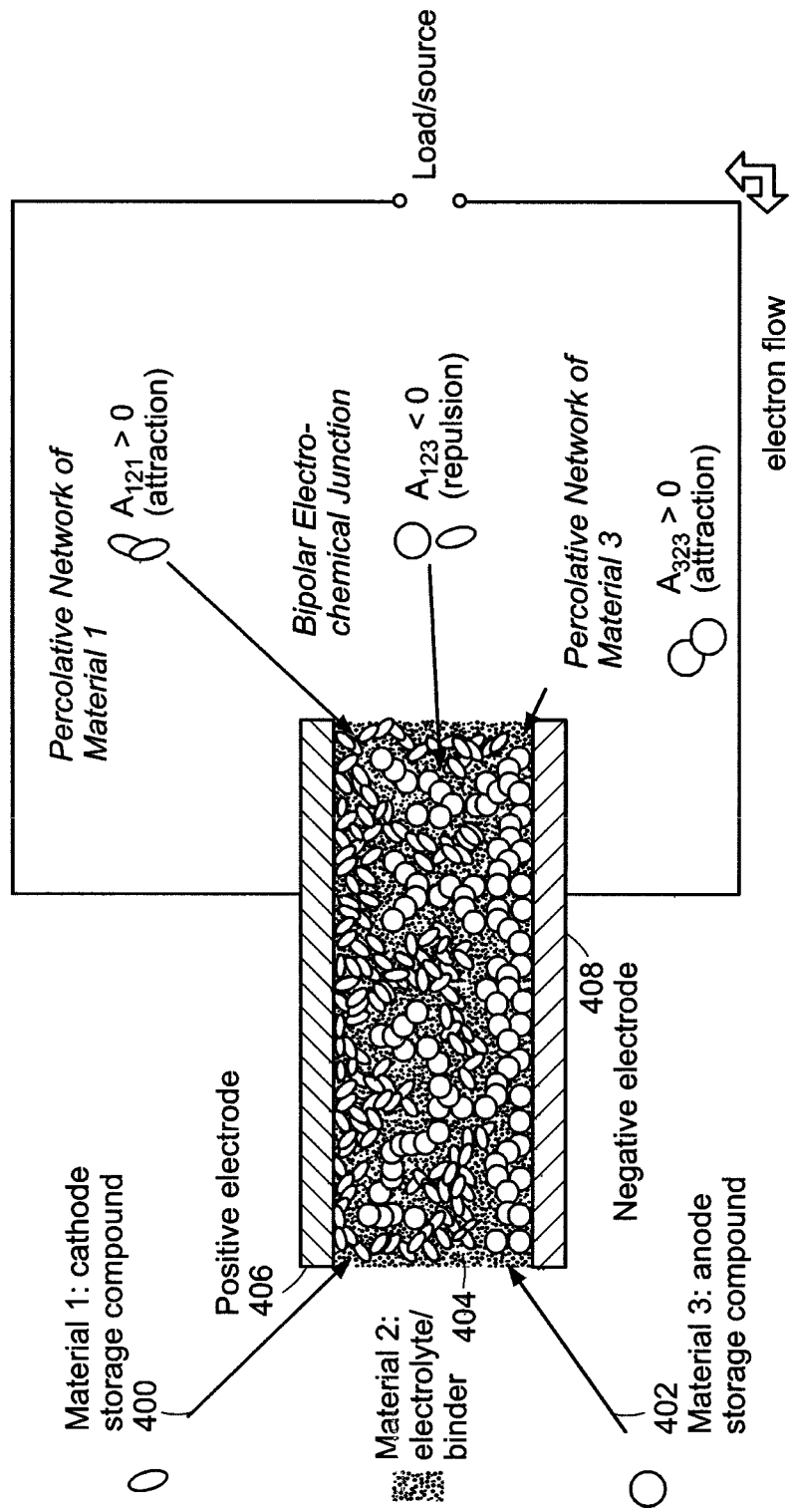
FIG. 4 is a schematic illustration of a self-organizing bipolar article according to certain embodiments of the invention.

FIG. 4 schematically illustrates an example of a self-organizing interpenetrating bipolar device. The bipolar device includes a cathode storage compound 400 ("material 1") and an anode storage compound 402 ("material 3"), which are both dispersed in an electrolyte 404 ("material 2"). The materials 1 and 3 contact respective current collectors 406, 408. The materials 1, 2, and 3 are selected such that when materials 1 and 3 are dispersed in material 2, materials 1 and 3 repel each other. Also, the particles of material 1 self-attract and thereby aggregate, as do the particles of material 2. The system thus allows for the provision of self-organizing and separated cathode and anode networks. This allows for the formation of a self-organizing, co-continuous, interpenetrating microstructure, in which one electrode is continuously wired to a current collector, and another electrode to another current collector. A repelling dispersion force ensures electronic isolation of the two networks.

The principles of surface forces are used in the organization of bipolar devices. Van der Waals (vdW) forces between molecules and condensed phases are composed of three contributions, a Keesom force due to interactions between oriented permanent dipoles, a Debye force due to polarization induced in other molecules by a permanent dipole, and a London dispersion force due to polarization induced in other molecules by oscillations in the electron cloud of interatomic bonds. Of these, the London dispersion force is the most universal, since it does not require the existence of permanent dipoles.

An important parameter scaling the dispersion force is the Hamaker constant A. For symmetric combinations of materials (e.g., 121 or 212), the Hamaker constant $A_{121}=A_{212}$ is always positive, leading to an attractive dispersion force ($F_{vdW}<0$). For asymmetric combinations (e.g., 123), the dispersion force can be either attractive or repelling. For most materials, and especially low refractive index materials (n<2), the dominant interactions occur in the optical frequency range, and the Hamaker constant can be approximated to good accuracy using optical index and static dielectric constant approximations as represented by the following equation:

$$A_{123} \equiv \frac{3}{4}kT\left(\frac{E_1 - E_2}{E_1 + E_2}\right)\left(\frac{E_3 - E_2}{E_3 + E_2}\right) +$$
$$\frac{3}{8}\frac{h v_e}{\sqrt{2}} \frac{(n_1^2 - n_2^2)(n_3^2 - n_2^2)}{(n_1^2 + n_2^2)^{1/2}(n_3^2 + n_2^2)^{1/2}\{(n_1^2 + n_2^2)^{1/2} + (n_3^2 + n_2^2)^{1/2}\}}$$

The electronic frequency $v_e$ corresponds to the mean ionization frequency of the materials present. Typically, $v_e \approx 3 \times 10^{15}$ Hz. k is Boltzmann's constant and h is Plank's constant. The refractive indices in the visible range for mediums 1, 2, and 3 are $n_1$, $n_2$, and $n_3$, respectively. $E_1$, $E_2$, and $E_3$ are the static relative dielectric constants. The first term in the equation gives the zero frequency energy of the van der Waals interaction, and includes the Keesom and Debye dipolar contributions. For two non-polar media acting over a third medium, the first term is not significant.

When the indices are ordered as $n_1 > n_2 > n_3$, $A_{123}$ is negative. Thus, the sign and magnitude of the Hamaker constant can be readily estimated from optical and dielectric data, while more precise quantification, where necessary, is possible with full-spectral methods.

To provide a self-organizing system for two dissimilar materials 1 and 3 separated by a medium 2, the vdW interaction is rendered repelling through judicious selection of materials characterized by a negative Hamaker constant $A_{123}$. Numerous combinations of materials 1, 2, and 3 provide such a self-organizing system. Table 1 lists non-limiting examples of some useful materials and combinations.

TABLE 1

Dispersion-Force Organized Systems

| System | Material 1 (Cathode) | Material 2 (Separator/Electrolyte) | Material 3 (Anode) |
|---|---|---|---|
| 1 | $LiCoO_2$<br>Mg-doped $LiCoO_2$<br>$LiMn_2O_4$<br>$LiMnO_2$<br>$LiNiO_2$ | Poly(ethylene oxide) (PEO) or poly(ethylene glycol) (PEG) poly(styrene) (PS) poly(acrylonitrile) (PAN) (each of the above optionally doped with a lithium salt for $Li^+$ conductivity) PEO or PVDF dissolved in a high refractive index solvent such as diiodomethane, 1,3-diiodopropane, N,N-dimethylformamide (DMF), bromobenzene, cyclohexane, or dimethylpropylene urea (DMPU), the solvent being subsequently evaporated and an organic liquid electrolyte being infused. | Mesocarbon microbeads (MCMB)or, an unlithiated metal anode, such as Sn, Zn, Al, or Si, in each case coated with: POMA/PVDF or POTh/PVDF |
| 2 | Cathodes as in System 1, coated with:<br>POMA[1]/PVDF[2]<br>POTh[3]/PVDF<br>PEDT[4]/PTFE[5]<br>PEDT/PP[6]<br>PEDT/HDPE[7] | Same as in System 1 | Mesocarbon microbeads (MCMB) an unlithiated metal anode, such as Sn, Zn, Al, or Si |
| 3 | $LiFePO_4$<br>$Li_2Fe_2(SO_4)_3$,<br>$V_6O_{11}$<br>$V_2O_5$ | Same as in System 1 | Mesocarbon microbeads (MCMB) a lithiated metal anode such as Li, LiAl, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$ |
| 4 | $LiFePO_4$<br>$Li_2Fe_2(SO_4)_3$,<br>$V_6O_{11}$<br>$V_2O_5$ | $Li_2OB_2O_3$—$Bi_2O_3$ glass<br>$Li_2O$—$B_2O_3$—PbO glass | Mesocarbon microbeads (MCMB) a lithiated metal anode such as Li, LiAl, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$ |
| 5 | Cathodes as in System 1, coated with:<br>vanadium oxide<br>hydrated vanadium oxide<br>vanadium oxide - PEO blend<br>vanadium-boron-oxide<br>vanadium-silicon-oxide | Same as in System 1 | Mesocarbon microbeads (MCMB) an unlithiated metal anode, such as Sn, Zn, Al, or Si |

TABLE 1-continued

Dispersion-Force Organized Systems

| System | Material 1 (Cathode) | Material 2 (Separator/Electrolyte) | Material 3 (Anode) |
|---|---|---|---|
|  | vanadium-phosphorus-oxide |  |  |

[1]Poly(2-methoxyaniline)
[2]Poly(vinylidene fluoride)
[3]Poly(3-octylthiophene)
[4]Poly(3,4-ethylenedioxythiophene)
[5]Poly(tetrafluoroethylene)
[6]Polypropylene
[7]High density polyethylene Accordingly, in some embodiments, useful cathode and anode materials include, but are not limited to, one or more of $LiCoO_2$, $Li(Mg_xCo_{1-x})O_2$, $LiNiO_2$, $LiMn_2O_4$, $LiMnO_2$, $Li(Al_xMn_{1-x})O_2$, doped and undoped $LiFePO_4$, $Li_2Fe(SO_4)_3$, $V_2O_5$, $V_6O_{11}$, C, amorphous carbon, graphite, mesocarbon microbeads (MCMB), Li, LiAl, $Li_9Al_4$, $Li_3Al$, Zn, LiZn, Ag, LiAg, $Li_{10}Ag_3$, B, $Li_5B_4$, $Li_7B_6$, Ge, Si, $Li_{12}Si_7$, Li, LiAl, $Li_{13}Si_4$, $Li_{21}Si_5$, Sn, $Li_5Sn_2$, $Li_{13}Sn_5$, $Li_7Sn_2$, $Li_{22}Sn_5$, Sb, $Li_2Sb$, $Li_3Sb$, Bi, LiBi, $Li_3Bi$, $SnO_2$, SnO, MnO, $Mn_2O_3$, $MnO_2$, $Mn_3O_4$, CoO, NiO, FeO, $LiFe_2O_4$, $TiO_2$, $LiTi_2O_4$, Sn—B—P—O compounds, and glass. In particular embodiments, an anode includes one or more of the following materials: carbon, amorphous carbon, graphite, mesocarbon microbeads, Li, LiAl, $Li_9Al_4$, $Li_3Al$, Zn, LiZn, Ag, LiAg, $Li_{10}Ag_3$, B, $Li_5B_4$, $Li_7B_6$, Ge, Si, $Li_{12}Si_7$, $Li_{21}Si_8$, $Li_{13}Si_4$, $Li_{21}Si_5$, Sn, $Li_5Sn_2$, $Li_{13}Sn_5$, $Li_7Sn_2$, $Li_{22}Sb_5$, Sb, $Li_2Sb$, $Li_3Sb$, Bi, LiBi, and $Li_3Bi$, $SnO_2$, SnO, MnO, $Mn_2O_3$, $MnO_2$, $Mn_3O_4$, CoO, NiO, FeO, $LiFe_2O_4$, $TiO_2$, $LiTi_2O_4$, and glass. In certain embodiments, a cathode includes one or more of the following materials: $LiCoO_2$, $LiCoO_2$ doped with Mg, $LiNiO_2$, $LiMn_2O_4$, $LiMnO_2$, $LiMnO_2$ doped with Al, doped and undoped $LiFePO_4$, $LiMnPO_4$, $Li_xV_6O_{13}$, $Li_2Fe_2(SO_4)_3$, $V_2O_5$, $V_6O_{11}$, and $SnO_2$.

In some embodiments, the separator/electrolyte medium 2 includes, but is not limited to, one or more of the following materials, selected to provide a repelling interaction or to wet between the cathode and anode materials 1 and 3: organic materials, such as, e.g., poly(ethylene oxide) (PEO), poly (styrene) (PS), poly(acrylonitrile) (PAN), poly(vinylidene fluoride) (PVDF), diiodomethane (DIM), 1,3-diiodopropane, N,N-dimethylformamide (DMF), dimethylpropylene urea (DMPU), ethylene carbonate (EC), diethylene carbonate (DEC), dimethyl carbonate (DMC), propylene carbonate (PC), and block copolymer lithium electrolytes, the preceding organic materials being doped with a lithium salt, such as, e.g., $LiClO_4$, $LiPF_6$, $LiAsF_6$, $LiHgI_3$, $LiCF_3SO_3$ or $LiBF_4$, to provide lithium ionic conductivity; and inorganic materials, such as, e.g., LiI, LiF, LiCl, $Li_2O$—$B_2O_3$—$Bi_2O_3$ compounds including glass, $Li_2O$—$B_2O_3$—$P_2O_5$ compounds including glass, $Li_2O$—$B_2O_3$—PbO compounds including glass, and sols or gels of the oxides or hydroxides of Ti, Zr, Pb, or Bi.

The cathode and/or anode materials 1 and 3 are optionally coated. For example, in certain embodiments a coating is provided on the cathode storage compound or the anode storage compound in order to obtain a repelling dispersion force between the two in the separator/electrolyte medium. Non-limiting examples of useful coating materials include electronically conductive polymers and blends thereof, e.g., polythiophene, polyanaline, poly(o-methoxyaniline) (POMA) or poly(3-octylthiophene) (POTh) with PVDF, PEO, or conductive oxides such as indium tin oxide (ITO).

Some particularly useful coatings include poly(3,4-ethylene dioxythiophene)(PEDT) or poly(3,4 ethylene dioxythiophene)-polystyrene sulfonate (PEDT-PSS) with polytetrafluoroethylene (PTFE), PTFE derivatives, or PVDF.

A detailed description of useful coating materials is contained in U.S. patent application Ser. No. 10/354,405, entitled "Electrodes and Related Devices," filed on Jan. 30, 2003, which is incorporated by reference herein. For example, as described in that application, coatings generally are selected to provide both the desired surface attractive and/or repulsive forces and adequate conductivity for electrochemical device function. Thus, the coating includes a conductive material, such as, e.g., a conductive polymer or a copolymer or blend of conductive polymers. Examples of conductive polymers include, without limitation, polyanilines (e.g., poly(2-methoxyaniline)), polythiophenes (e.g., poly(3-octylthiophene) and poly(3,4-ethylene dioxythiophene)), polypyrroles, polyetheylenes, and derivatives thereof. Other non-limiting examples of useful conductive materials include pure elements, such as carbon black, lithium, nickel, and zinc; metal oxides, such as vanadium oxide, indium tin oxide, titanium oxide, manganese oxide, and nickel oxide; and metal sulfides. In some instances, the coating material includes a dopant to improve conductivity. Suitable dopants include, but are not limited to, counter-ion sources such as, e.g., polystyrene sulfonate, hydrochloric acid, and lithiated compounds, tosylate ion, camphorsulfonic acid, dodecylbenzene sulfonic acid, perfluorodecane sulfonic acid, trifluoroacetic acid, and perchloric acid.

Some useful coatings also include a material with low refractive index, for example, to make the refractive index of the entire coating layer less than that of the electrolyte material being used. The amount of low index material in the coating is chosen to provide a desired average refractive index for the coating layer. Suitable low refractive index materials include, but are not limited to, fluorinated polymers, polypropylene, and vanadium oxide. Non-limiting examples of fluorinated polymers include PTFE, PVDF, fluorinated esters of methacrylic acid (e.g., hexafluoroisopropylmethacrylate, heptafluorobutylmethacrylate, trifluoroethylmethacrylate, and pentafluorobutylmethacrylate), fluorinated esters of methacrylic acid, and copolymers and blends thereof.

In some alternative embodiments, a separator/electrolyte material is selected to give a repelling dispersion force between the cathode and anode storage compounds, even in the absence of a coating. As a non-limiting example, the separator/electrolyte is an inorganic glassy material selected to have sufficiently high refractive index to provide a repelling dispersion force between the cathode and anode compounds, as well as sufficiently high lithium ionic conductivity and low electronic conductivity to act as an electrolyte.

To form a bipolar article, the self-organizing mixture is cured, and the anode and cathode networks are wired only to anode and cathode current collectors, respectively. One non-limiting example of a way to achieve proper wiring is to use surface forces on the anode and cathode particles for proper positioning. The principles that allow the respective networks to form and yet repel each other are used to wire the networks to their respective current collectors. Each current collector has a surface that attracts either the cathode or the anode and repels the other. In some embodiments, at least one of the current collectors is coated to provide the desired attractive and repulsive forces. Useful coating materials include those described above for coating anode and cathode materials. However, as one of skill in the art will appreciate, somewhat different selection criteria apply for choosing a coating for a current collector, as opposed to an electrode coating. For a current collector coating, ionic conductivity is not required. Also, the electrical conductivity of the coating is less important, because electrons need to travel through only a single coating layer to cross into the current collector. Furthermore, thicker coatings are suitable for coating current collectors, e.g., up to about 1 µm coating thickness for a 10 µm thick current collector. In comparison, particle coatings are generally thinner, e.g., up to about 0.1 µm coating thickness for a 5 µm wide cathode particle.

For example, in some embodiments, London Dispersion Forces are used. One current collector is coated with a thin layer of a conductive low refractive index material, such as a conductive polymer blend, which attracts low refractive index active materials (e.g., appropriately-encapsulated $LiCoO_2$ particles) and repels high refractive index active materials (e.g., MCMB). The opposing current collector is chosen to have a high refractive index (e.g., pure Cu), which has the opposite attracting and repelling effects. In at least some embodiments, in order to make use of surface forces that are strong over relatively small length scales (less than about a few microns for London Dispersion Forces in most systems), the self-organizing composition is well-mixed, so that the anode and cathode particles are randomly and homogeneously distributed on a micron-level length scale.

Alternatively, fields such as gravity or magnetism are used to wire the cathode and anode networks to their respective current collectors, again by appropriate selection of materials. In the case of gravity, materials are selected to provide a density contrast. As a non-limiting example, the density of the anode (e.g., MCMB) is less than that of the solvent/electrolyte (e.g., DIM+PEO+Li salt), which is less than that of the cathode (e.g., LiCoO). In such a system the anode current collector is above the cathode current collector.

Alternatively, a layered approach is used in conjunction with surface forces. In this approach, a thin (~10× the active particle diameter) coating of an active material appropriate for connection to a current collector is coated sequentially in the immediate proximity of the current collector and the self-organizing mixture. For example, a bottom current collector is deposited, followed by a layer of the appropriate active material, followed by a layer of self-organizing mixture of the nominal thickness of the cell layer, followed by a layer of the other active material, followed by the other current collector. Due to the high loading of the active materials (>~50%), shorting does not result.

The following are non-limiting examples of specific architectures contemplated for the bipolar devices as described herein, and specific methods of producing such devices.

Methods of Making Interpenetrating Electrode Batteries Having Arbitrary Form Factors A battery having virtually any desired form factor or shape is prepared with interpenetrating electrodes, for example, using the self-organizing principles described above. Such batteries are useful to efficiently utilize space in devices in which they are used. Suitable materials for making the battery include, e.g., traditional battery materials used in the field and self-assembling systems such as those described above.

Figures 5, 5A:
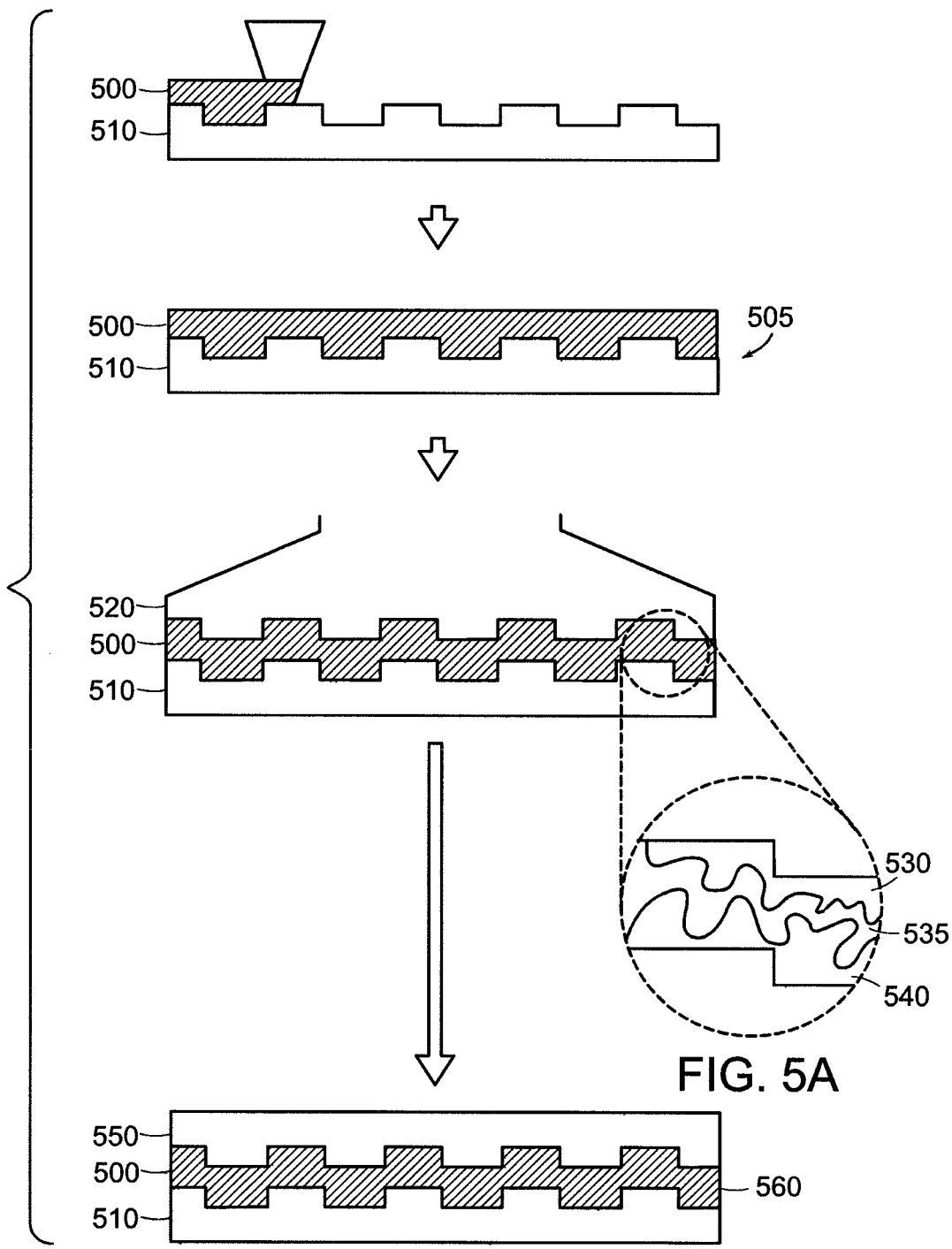
FIG. 5 is a schematic illustration of a stamping process for making a bipolar article of arbitrary form factor with a self-organizing system according to certain embodiments of the invention.
FIG. 5A shows a portion of the opposing electrodes enlarged to illustrate the arbitrary form factor.

Processes useful for making batteries or other bipolar articles of arbitrary form factor with interpenetrating electrodes include, but are not limited to, coating, stamping, embossing, printing, and injection molding. One non-limiting example of a stamping process, illustrated in FIG. 5, is as follows:
 (1) Prepare a self-assembling mixture 500.
 (2) Tape cast a cell precursor slab 505, for example, by tape casting the self-assembling mixture 500 on a current collector 510.
 (3) Stamp the mixture 500 with a form 520 while the mixture 500 is still viscous, optionally shaping one or both sides of the mixture 500.
 (4) Allow the stamped mixture 500 to self-assemble and cure, forming anode and cathode networks 530, 540 with electrolyte 545 disposed there between.
 (5) Form or attach a second current collector 550 to the battery 560.

FIG. 5A shows a portion of the opposing electrodes enlarged to illustrate the arbitrary form factor. The current collectors 510, 550 optionally extend over the entire surfaces of the respective anode and cathode components. In alternative embodiments, current collectors extend over only portions of the anode and cathode as illustrated in FIG. 2.

Figure 6A:
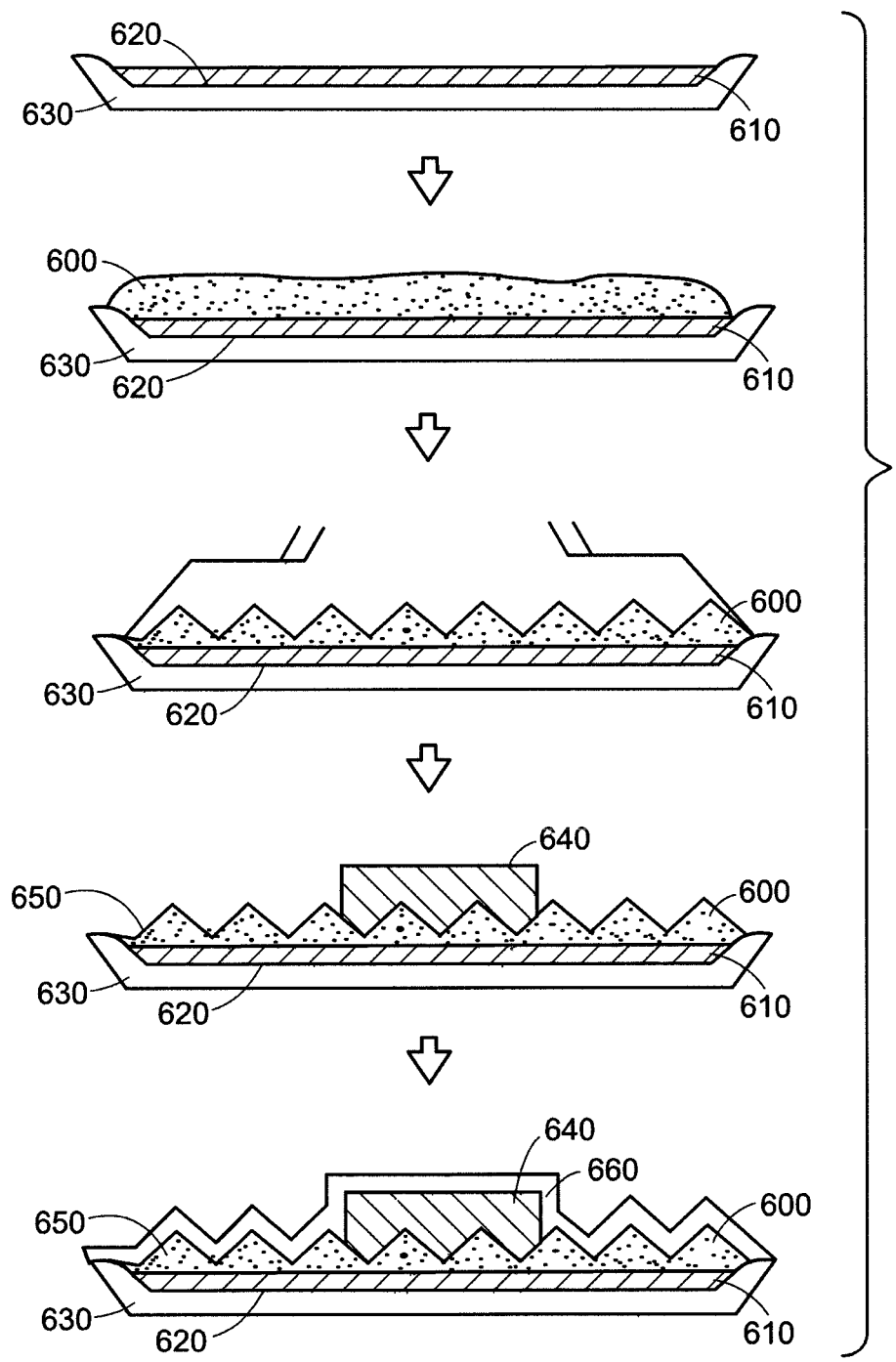
FIG. 6A is a schematic illustration of a stamping process for embedding a self-organizing battery in a device according to certain embodiments of the invention.

In some embodiments, interpenetrating electrode batteries are embedded or integrally formed within various device, such as, e.g., cell phones, personal digital assistants, laptop computers, and the like. Various processes are useful for embedding interpenetrating electrode batteries in devices. For example, FIG. 6A illustrates a process in which a self-organizing battery is formed by stamping into a device as follows:
 (1) Prepare a self-assembling mixture 600.
 (2) Attach a first current collector 610 to a surface of a device 620, e.g., within the device housing 630.
 (3) Deposit the self-assembling mixture 600 on the first current collector.
 (4) Stamp the self-assembling mixture 600 to form fit the desired surface topology.
 (5) Attach a second current collector 640 to the surface of the battery 650 opposite the first current collector 610.
 (6) Allow the stamped mixture 600 to set.
 (7) Apply a protective overcoat 660 to the battery 650.

Alternatively, the mixture 600 is injected into a cavity in the device and cured using the self-assembling principles described above.

Figure 6B:
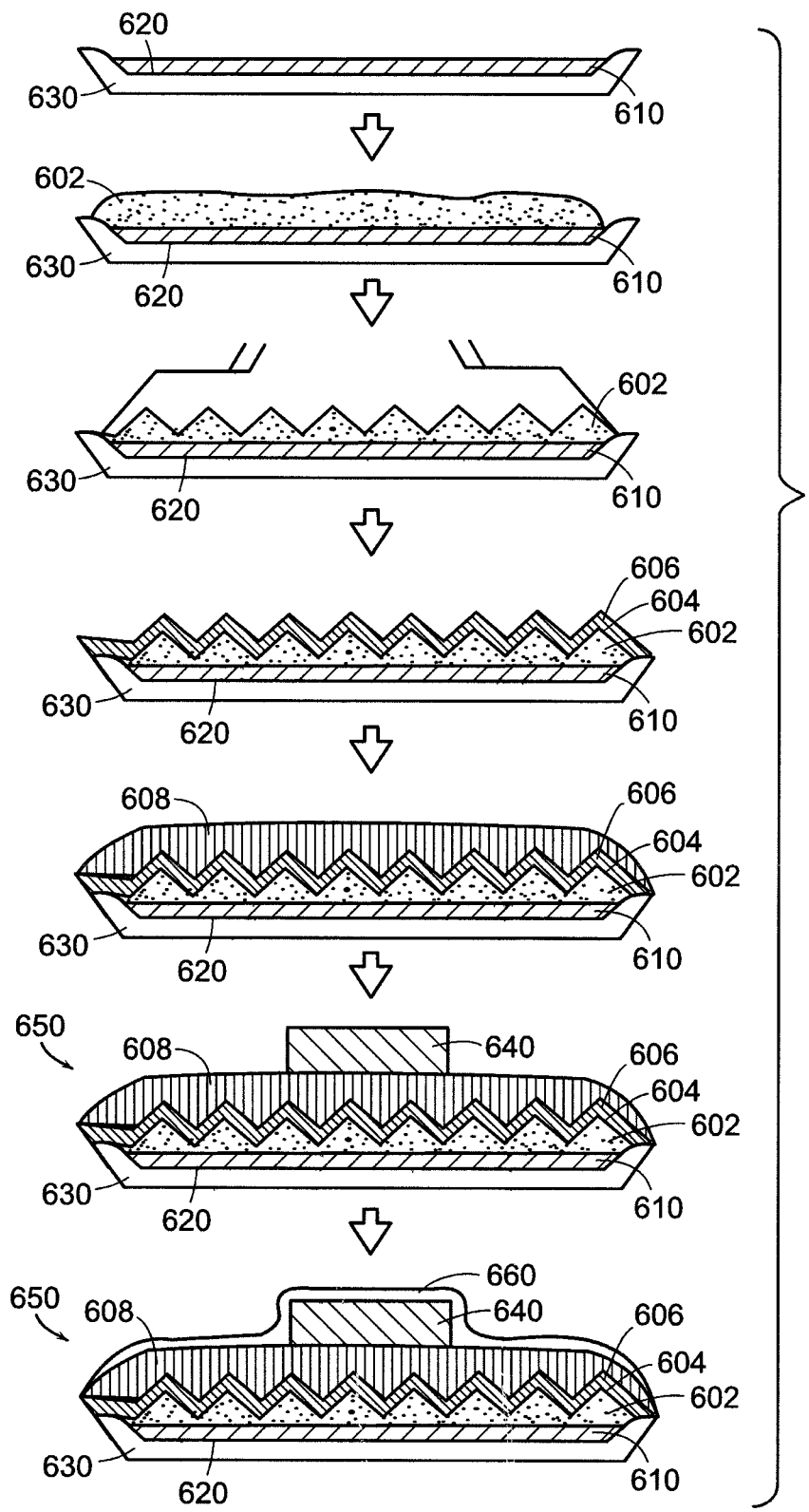
FIG. 6B is a schematic illustration of a stamping process for embedding an interpenetrating electrode battery in a device according to certain embodiments of the invention.

FIG. 6B illustrates a similar process for making an interpenetrating electrode battery with non-self assembling electrode materials by stamping into a device as follows:
 (1) Prepare a cathode mixture 602.
 (2) Attach a first current collector 610 to a surface of the device 620, e.g., within the device housing 630.
 (3) Deposit the cathode mixture 602 on the first current collector.
 (4) Stamp the cathode mixture 602 to provide a first reticulated electrode.
 (5) Coat the surface 604 of the stamped cathode mixture 602 with an ionically permeable separator layer 606.

(6) Coat the ionically permeable separator layer 606 with an anode material 608.

(7) Attach a second current collector 640 to the anode 608.

(8) Apply a protective overcoat 660 to the battery 650.

In certain embodiments, the separator layer 606 includes a Kynar-based material with a PVDF-rich binder.

Multi-Layered Battery

FIG. 7 illustrates one example of a multi-layered battery including three battery layers 700, 702, 704 separated by an anode current collector 706 and a cathode current collector 708. In the illustrated embodiments, the battery layers 700, 702, 704 are self-organizing. Each layer 700, 702, 704 includes self-organizing cathode and anode networks. In some alternative embodiments, non-self-organizing, e.g., sequentially deposited, layers are employed. Although not shown in the figure, in some embodiments, the anode and cathode networks are interpenetrating. The battery layers are oriented in an alternating arrangement such that the anode network of one layer faces the anode network of an adjacent layer, and the cathode network of one layer faces the cathode network of an adjacent layer. The battery layers 700, 702 are separated by the cathode current collector 708, which is in contact with the cathode networks of the layers. The battery layers 702, 704 are separated by the anode current collector 706, which is in contact with the anode networks of the layers. The cathode current collector 708 is electrically connected to an outer cathode current collector, and the anode current collector 706 is electrically connected to an outer anode current collector. In particular embodiments, the anode and cathode current collectors 706, 708 are electrically insulated from each other to inhibit shorting. In some instances, the battery layers 700, 702, 704 each have a thickness of about 0.1 mm to about 5 mm, and the anode and cathode current collectors 706, 708 each have a thickness of about 0.005 mm to about 0.05 mm. This allows for a high battery to current collector ratio, e.g., a ratio greater than about 10:1, and in some instances significantly greater than 10:1. A higher battery to current collector ratio provides higher energy density.

Figure 8:
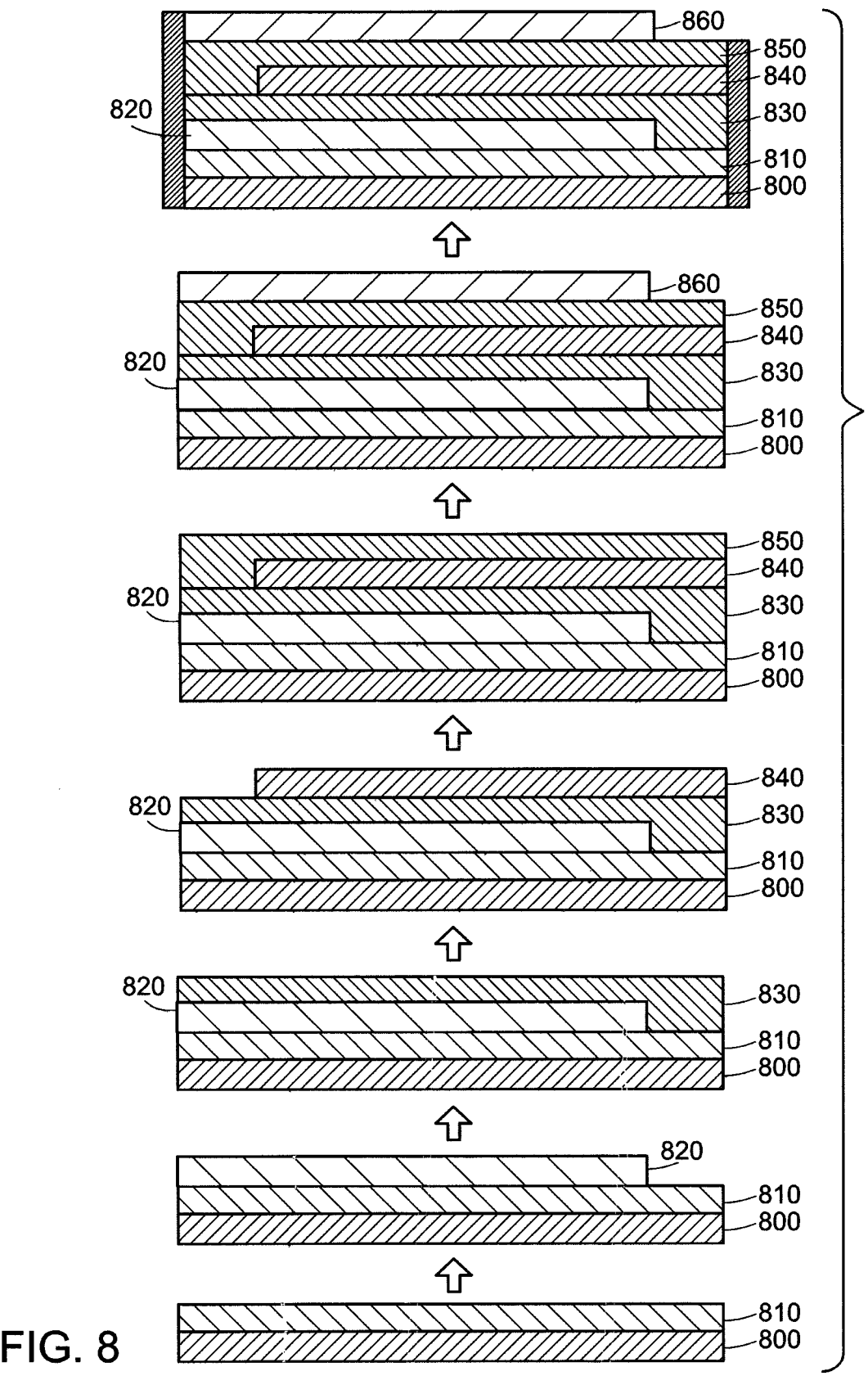
FIG. 8 is a schematic illustration of a method for making a self-organizing multi-layered battery according to certain embodiments of the invention.

In some embodiments, a multi-layered battery is made by depositing multiple battery layers on multiple current collectors. FIG. 8 illustrates a non-limiting example of a method for making a self-organizing multi-layered battery as follows:

(1) Deposit a first layer of self-organizing material 810 on an outer cathode current collector 800, and cure.

(2) Affix an anode current collector 820 on the first layer 810.

(3) Deposit a second layer of self-organizing material 830 on the anode current collector 820, and cure.

(4) Affix a cathode current collector 840 on the second layer 830.

(5) Deposit a third layer of self-organizing material 850 on the cathode current collector 830, and cure.

(6) Affix an outer anode 860 to the third layer 850.

(7) Electrically connect the anode current collectors 820, 860 to each other, and the cathode current collectors 800, 840 to each other.

In some alternative embodiments, all of the layers 810, 830, 850 are cured at the same time, self-assembling into anode and cathode networks according to the self-organizing principles described above. In certain alternative embodiments, non-self-organizing anode and cathode materials are employed.

Interpenetrating Current Collector with Projecting Elements

FIG. 9 illustrates an example of a battery with an interpenetrating current collector structure. The battery includes a cathode current collector 900, an anode current collector 902, and a self-organizing battery structure 904 disposed there between. The self-organizing battery structure forms cathode and anode networks, which are in contact with their respective current collectors. Although not shown in the figure, in some embodiments the anode and cathode networks themselves are interpenetrating. Each current collector 900, 902 includes a plurality of projecting elements or prongs 906, which extend into spaces 908 between projecting elements of the other current collector 900, 902. By way of the prongs 906, each of the current collectors 900, 902 penetrates into the self-organizing electrode assembly 904 for a distance that is less than the full dimensionality of the cell. The cathode and anode current collectors 900, 902 have an interpenetrating arrangement, and define a serpentine gap there between. In some alternative embodiments, only one of the current collectors includes projecting elements, and the other current collector has a planar or other structure.

FIG. 10A illustrates a non-limiting example of a method for making a self-organizing battery with interpenetrating current collectors as follows:

(1) Deposit self-organizing material 110 on the first current collector 112, which can be either the anode or the cathode current collector.

(2) Position the other current collector 114 in an interpenetrating arrangement with and spaced apart from the first current collector 112.

(3) Cure the self-organizing material 110 to form cathode and anode networks 116, 118 with electrolyte 117 disposed there between. The networks 116, 118 are in contact with their respective current collectors 114, 112.

One exemplary alternative method, illustrated in FIG. 10B, is as follows:

(1) Arrange the anode and cathode current collectors 112, 114 in a spaced-apart, interpenetrating arrangement.

(2) Introduce the self-organizing material 120 in the serpentine gap 119 between the current collectors 112, 114.

(3) Cure the self-organizing material 110 to form cathode and anode networks 116, 118 with electrolyte 117 disposed there between. The networks 116, 118 are in contact with their respective current collectors 114, 112.

One of skill in the art will understand that, while self-organizing materials constitute one particularly useful set of materials for making batteries with interpenetrating current collectors and other alternative bipolar structures described herein, such structures are also suitably produced using various non-self-organizing materials known in the field. For example, in some embodiments, a laminar approach is used, providing anode, cathode, and electrolyte layers on current collectors to form a battery having interpenetrating current collectors and/or arbitrary form factors from standard battery materials known in the art.

Mesh Layer Structure

Figure 11A:
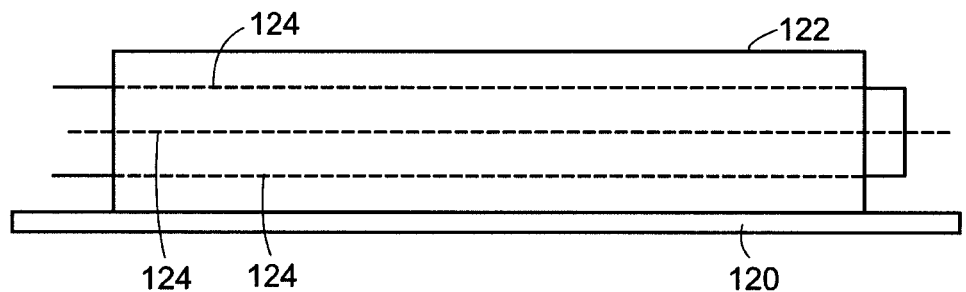
FIG. 11A is a schematic illustration of a self-organizing battery structure with layered mesh current collectors according to certain embodiments of the invention.
Figure 11B:
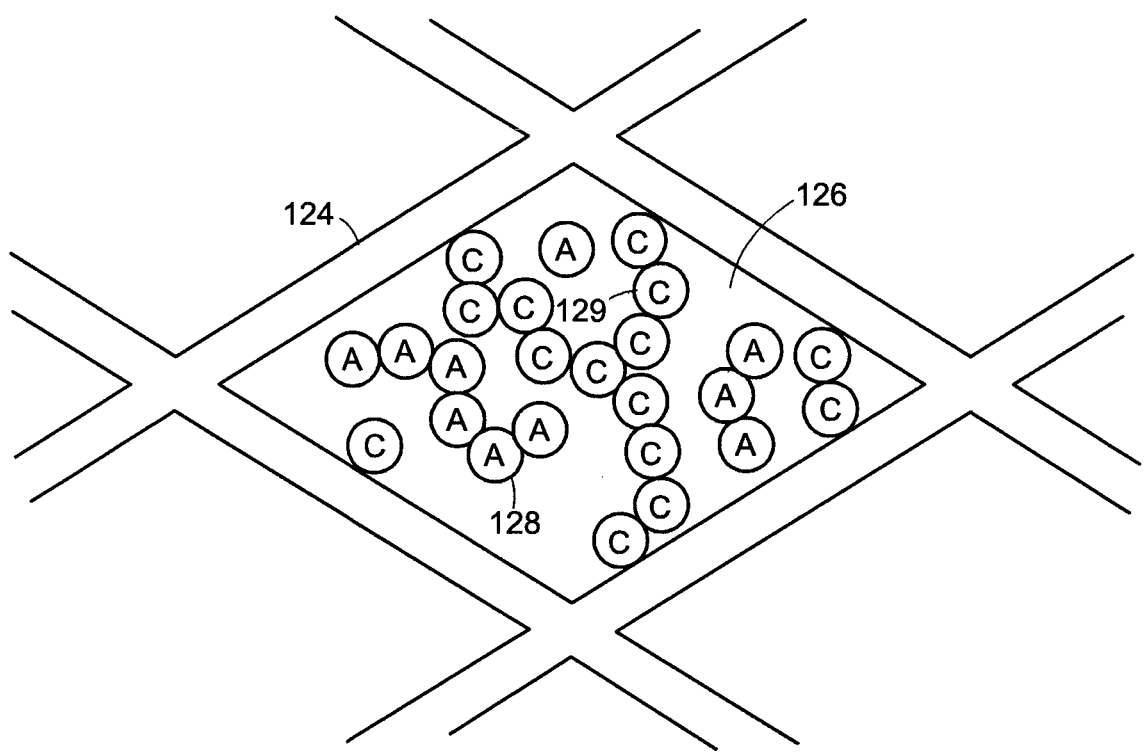
FIG. 11B is an enlarged view of a portion of a mesh layer shown in FIG. 11A.

Another example of an interpenetrating current collector structure includes an open or porous current collector that is inserted into an electrode. For example, FIGS. 11A-B illustrate an example of a battery with an open, e.g., mesh current collector. As shown in the side view of FIG. 11A, the battery includes a first generally planar current collector 120, on which is a battery 122. In the illustrated embodiment, the battery 122 is self-organizing. One or more mesh layers 124 forming the second current collector extend through the self-organizing battery 122 at spaced-apart positions above the first current collector 120. In various embodiments, the mesh layers 124 form either the anode or cathode current collector. In some instances, the mesh layers are used as the cathode current collector, because the electrical conductivity of the cathode network sometimes is not sufficient to provide high power density in thick batteries. FIGS. 11A-B show the mesh layers forming the cathode current collector. FIG. 11B is an enlarged top view of a portion of one of the mesh layers 124. The mesh layers include a plurality of openings 126. The openings 126 are large enough to allow multiple anode network elements or particles 128 and cathode network elements or particles 129 to fit therein. For example, in certain embodiments, the cathode and anode elements or particles 129, 128 have a diameter on the order of 2 μm, and the mesh spacing is greater than about 200 μm. In some alternative embodiments, the cathode and anode elements or particles 129, 128 have a diameter on the order of 200 μm, and the mesh spacing is greater than about 20 mm. In the embodiment illustrated in FIG. 11B, the mesh 124 is attractive to and thereby in contact with the cathode network particles 129, and is repulsive to the anode network particles 128.

Figure 12:
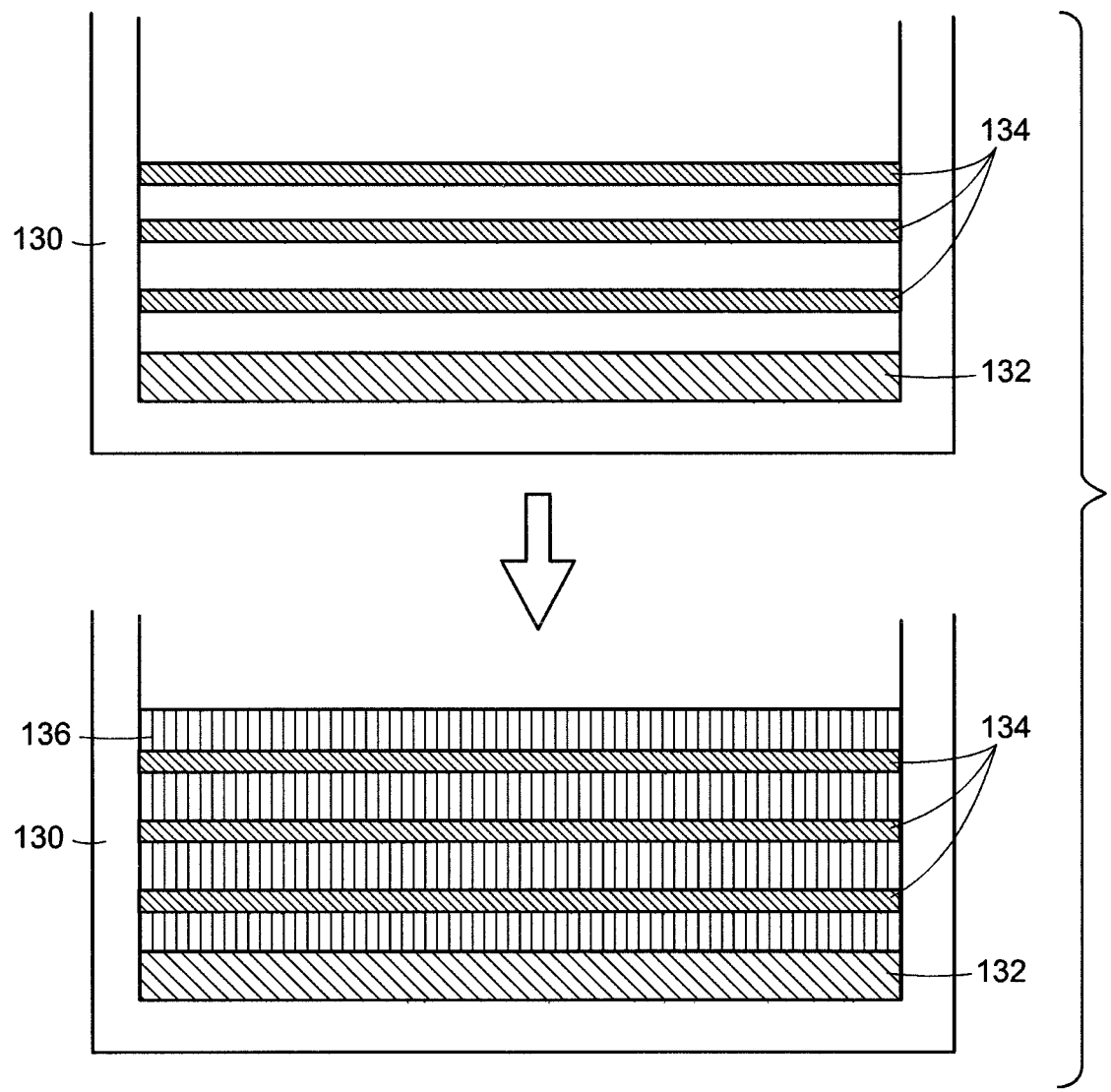
FIG. 12 is a schematic illustration of a method for making a self-organizing mesh layer battery according to certain embodiments of the invention.

One non-limiting example of a method for making a self-organizing mesh layer battery, illustrated in FIG. 12, is as follows:
  (1) Assemble a mold 130 having an anode current collector 132 and a plurality of spaced apart cathode current collector mesh layers 134 suspended above the anode current collector 132.
  (2) Introduce a self-organizing battery mixture 136 into the mold 130 covering the current collectors 132, 134.
  (3) Cure the self-organizing material 136, and remove the battery from the mold 130.

In some alternative embodiments, a generally continuous manufacturing process is used in which the self-organizing material is continuously deposited on moving, continuous sheets of current collector material (i.e., layers of cathode current collector suspended over an anode current collector). The self-organizing material cures while moving, and is cut in desired sizes. Such continuous manufacturing processes are suitable for producing not just the present mesh embodiment, but also various other device architectures described herein. Furthermore, as noted above, self-organizing materials are useful, but various alternative materials known in the field are suitable for producing the mesh layered battery and other bipolar structures described herein.

Porous Electrode

Another example of an interpenetrating current collector structure includes a current collector that is introduced into a porous electrode, which, in at least some instances, has an arbitrary form. In some embodiments, a battery with a porous electrode structure is provided. A first highly "open" porous electrode (e.g., sintered LMCO) is fabricated with pore diameters much greater than the primary particle size of the material to be used as the opposite electrode. This first structure is formed partially or completely of a storage electrode material by a process such as, for example, pressing, aggregation, or sedimentation of particles or coated particles into a preform mold of the desired arbitrary shape, or stamping of particles or coated particles into the desired arbitrary shape. Current collector(s) (e.g., having forms as described elsewhere herein) are inserted into the porous network prior to such pressing, aggregation, etc. The particles are optionally heat treated or sintered to improve the strength and electrical conductivity of the porous structure. In some embodiments, a powder preform of the first electrode is formed into the desired arbitrary shape as a "green body" prior to sintering. Current collectors are embedded within the powder preform and sintered in place. After sintering, the pellet with embedded current collectors optionally is etched to fully remove any current collector from the pore space.

In some alternative embodiments, the porous structure is formed using a removable pore-forming material, or phase-separation or precipitation of the constituents of the structure from a liquid or solid followed by removal of a pore forming material. In other alternative embodiments, an active material is directly fabricated as a foam. Further useful methods for forming the structure include, but are not limited to, lamination of porous layers, layer-by-layer additive or subtractive deposition methods, such as lithographic patterning and selective etching, and three-dimensional printing of the structure material.

An electronically insulating, ionically conducting layer is formed upon the surfaces of the first structure. For example, the insulating layer is an organic or inorganic solid electrolyte, or is a separator that is subsequently infiltrated with a liquid or solid electrolyte to provide ionic conductivity. The insulating layer coats the internal and external surfaces of the first structure, and is formed by a method such as, for example, infiltration of the first structure with the insulator in a molten form, infiltration of the first structure with a liquid containing the constituents of the electronic insulator, deposition of the insulator constituents from a vapor phase such as by chemical or physical vapor deposition or plasma-enhanced deposition, reaction of the material of the first structure with a vapor phase or a deposited material to form the surface insulating layer, electrolytic or electrochemical deposition, or a combination of such methods. As a non-limiting example, the interior pore space and optionally the current collector penetrating into the pore space is coated with a precursor to an electrolyte (e.g., PEO+electrolyte salt mixture). The insulating layer is formed in one or in multiple process steps. The structure has substantially open porosity after the insulating layer is formed on internal surfaces of the first structure.

The open porosity in the insulator-coated first structure is then infiltrated with the second electrode material, or a composite mixture containing the second storage material, resulting in a second interpenetrating electrode that substantially occupies the pore space in the first structure. The second interpenetrating electrode forms an electronically conductive network, and is electronically isolated from the first electrode by an intervening electrolyte layer. In some embodiments, the first structure is infiltrated with a fluid comprising the second electrode material, and a reaction of the first structure with the second electrode material or other constituents of the fluid is used to form an electrolyte layer. The second electrode material is infiltrated, for example, as a melt, as a vapor phase species, by electrolytic or electroless plating, as a liquid solution that subsequently dries or is reacted to form the second electrode material, or as a suspension of the second electrode material in a liquid.

In certain embodiments, a suspension of the second electrode material is used. The liquid in which the second electrode material is dispersed is optionally a liquid or solid electrolyte, or contains a binder or the constituents of an electrolyte in a solvent, or contains a material that improves the electronic conductivity of the second interpenetrating electrode, such as, e.g., fine carbon or metal particles, or the constituents of an electronically conductive polymer. As a non-limiting example, a coated perform porous electrode is infiltrated with a mixture including the opposite electrode material (e.g., MCMB), and optionally a precursor to an electrolyte (e.g., PEO+electrolyte salt mixture), and optionally a conductive additive to provide a supplemental current path—effectively acting as a current collector.

In some embodiments, a self-organizing system is used, in which second electrode particles and electrolyte materials are selected to exhibit the desired attractive and repulsive forces. Thus, when the first porous electrode structure is infiltrated with a suspension containing the second electrode material, a repulsive force results between the two electrode materials, causing their electronic isolation from each other. Accordingly, the electrolyte coats the walls of the first porous electrode, while the second electrode accumulates in the interior pore space. The repulsive properties of first porous electrode and second electrode particles prevents the deposition of second electrode particles on the walls of the first porous electrode form, thereby avoiding shorting of the system.

After infiltration of the first porous electrode by the second electrode material and the attachment of a second current collector to this material, a device comprising interpenetrating electrodes is obtained. In certain embodiments, the second current collector is inserted in the interpenetrating electrode structure to create an interpenetrating current collector. For example, in one such embodiment, a second current collector is used that has similar repulsive force characteristics as the second electrode material.

The following non-limiting examples further illustrate certain embodiments of the invention.

Example 1

A thick symmetric electrochemical cell with interpenetrating electrodes is provided, with multiple current collectors wired in parallel distributed throughout the thickness of the battery. The current collectors are configured in parallel by embedding them so that the cathode collector only connects to the cathode network and the anode collector only connects to the anode network. The approximate spacing between current collectors and the number of layers in the cell are chosen by balancing design parameters as discussed in detail above with respect to Equations 1-3. The interpenetrating current collector structure allows for a cell that provides similar rate capability with significantly fewer layers, and thus reduced current collector volume, compared to a standard cell, and significantly improved rate capability and life cycle compared to a three-dimensional battery with only a single set of current collectors. The interpenetrating current collectors overcome the inherent shortcomings in electronic conductivity over large distances to allow for a battery with a thickness greater than 0.1 mm, a power density greater than 300 W/kg, and an energy density of greater than 450 Wh/l.

The parameters of the cell are listed in Table 2 below. These parameters reflect a circuit in which charge moves through the cathode current collector across some fraction of the layer thickness of the cathode network, across the electrolyte layer, across the complementary fraction of the layer thickness of the anode network, and through the anode current collector for a number of layers in parallel. Some bounding estimates for the cell resistance are made. For example, the area fraction values assume a mesh with 67% open space along its length and thickness for the current collector layers, and assume that the area fraction is equivalent to the proportion of solids loading for the network and electrolyte layers. The anode and cathode current collector resistivities are known in the art, the anode and cathode network resistivity values are based on measurements of a conventional cell, and the electrolyte layer resistivity is based on the value for PEO at 40° C., which is known in the art. The area value for the electrolyte layer assumes a one-dimensional interpenetrating network with a 6 µm repeat distance. The values in Table 2 reflect charge transfer halfway through the interpenetrating network (0.1 cm over a 0.2 cm full layer thickness).

TABLE 2

| Cell | Thickness (cm) | Width (cm) | Length (cm) | Number of Layers |
|---|---|---|---|---|
| | 0.6 | 3.2 | 4.8 | 3 |

| Layer Network | Thickness (cm) | Area Fraction | Resistivity ($\Omega$ cm) | Length (cm) | Area ($cm^2$) | Resistance ($\Omega$) |
|---|---|---|---|---|---|---|
| Cathode Current Collector | 0.0025 | 0.33 | $2.60 \times 10^6$ | 4.8 | 0.003 | 0.005 |
| Cathode CC Coating | 0.0001 | 0.33 | 100 | 0.0001 | 5.069 | 0.002 |
| Cathode Network | 0.2 | 0.33 | 3 | 0.1 | 5.069 | 0.059 |
| Electrolyte Layer | 0.0002 | 0.31 | 500,000 | 0.0002 | 5.120 | 0.020 |
| Anode Network | 0.2 | 0.36 | 0.5 | 0.1 | 5.530 | 0.009 |
| Anode Current Collector | 0.0025 | 0.33 | $1.70 \times 10^6$ | 4.8 | 0.003 | 0.003 |
| Layer Resistance | | | | | | 0.094 |
| Total Cell Resistance | | | | | | 0.031 |

The DC resistance (effectively equivalent to the AC impedance at 1000 Hz) of the three-layer cell as shown in Table 2 is 31 mΩ for a 1.5 Ah capacity. The effective DC resistance of conventional prismatic Li-ion cells is in the range of 30-50 mΩ for 0.8-2.0 Ah capacities, respectively. Thus, without major changes to the resistivities of the cathode and anode networks and the electrolyte layer, the three-layer interpenetrating electrode system achieves effective DC resistances on the order of those for conventional cells. The resistivity of the cathode current collector coating is substantially less than 10,000Ω cm. For a thin coating about 1 µm thick, a resistivity on the order of 100Ω cm contributes 2 mΩ to the total layer resistance. The cathode network is generally the most resistive component of the cell.

The power density of conventional prismatic Li-ion cells is on the order of 300 W/kg. Consideration of two factors indicates that the power density of the cell described in Table 2 is at least about 300 W/kg. First, the effective DC resistance of the cell is 31 mΩ, a value on the order of that measured for conventional cells with similar capacities. Second, polarization within the cell is the primary mechanism controlling power density. For conventional batteries, polarization is dominated by Li transfer through the relatively thick (on the order of 100 µm) electrolyte layer. For the cell described in Table 2, the electrolyte layer is relatively thin, on the order of 1 µm. Because the rate of mass transfer is proportional to the square of the distance, the power density of the cell described in Table 2 is significantly greater than that of a conventional cell.

Example 2

A self-organizing bipolar system, suitable for use in making articles having interpenetrating current collectors and/or arbitrary form factors as described in Examples 3-8 below, is made using the components listed in Table 3.

TABLE 3

| | |
|---|---|
| Cathode Current Collector | Al |
| Cathode CC Coating | 10% PEDT-PSS (30 nm) with 90% PTFE powder |
| Cathode | LMCO (3% MgO) (density ~5 g/cc) |
| Encapsulant | 10% PEDT-PSS (30 nm) with 90% PTFE powder |
| Anode | 6 μm MCMB (density 2.1 g/cc) |
| Anode Current Collector | Cu |
| Electrolyte | PEG + LiClO$_4$ |
| Solvent | diiodomethane (DIM) + acetonitrile (AN) |

Coated Cathode Current Collector

Aluminum (Al) disks are coated with a conductive polymer blend of poly(3,4-ethylenedioxythiophene) poly(styrenesulfonate) (PEDT-PSS) and polytetrafluoroethylene (PTFE) to function as the cathode current collector. This coating has a refractive index that renders it attractive to the cathode material, lithium magnesium cobaltate (LMCO), and repulsive to the anode material, mesocarbon microbeads (MCMB).

The coating solution is prepared with 10 wt % PEDT-PSS, available under the trade name Baytron P from Bayer Corp. (one part poly(ethylene dioxythiophene) and 2 parts poly(styrene sulphonic acid)); 86.6 wt % Teflon from DuPont (Grade MP1100; narrow particle size distribution—1.5 to 4 μm); 3.3 wt % nonionic fluorinated surfactant, Zonyl FSN from DuPont (a perfluoroalkyl ethoxylated surfactant); and the balance water. 1.45 g of a 1.3 wt % PEDT-PSS dispersion is placed in a glass vial with a magnetic stir bar. With agitation, 0.611 g water is added. After this dilution, 126 μl of 5 wt % Zonyl FSN is added, followed by 145 μl of N-methyl-2-pyrrolidinone. Finally, 0.163 g Teflon MP 1100 powder is added, and the mixture is either agitated for at least 1 hour or sonified for 5 minutes. The resulting dispersion is 7.54 wt % solids.

The aluminum disks are prepared by taking extra heavy duty Reynolds aluminum and punching out disks of 9/16 in. diameter. Each disk is flattened smooth and then rinsed in acetone for 2 min., followed by ethanol for 2 min., and then dried. Each disk is then mounted on a glass plate using low tack adhesive, and the dull side of the disk is coated by applying 50 μl of the coating dispersion. The disks are dried at 75° C. for 40 min., and then at 150° C. for 1 hour. The dried coating thickness is 20 μm. The through conductivity is measured to be 5Ω (for a contact diameter of 0.25 in.), which corresponds to a volumetric conductivity of $1.26 \times 10^{-3}$ S/cm.

Coated Cathode Material

The cathode material is lithium magnesium cobaltate (LMCO) having a density of about 5 g/cc and a mean grains size of about 4 μm. As discussed above, properties such as density are factors meaningful to the gravitational settling of particles during self-organization. Grain size is a factor for device stability, with particle size generally being chosen to be less than the device dimension in order to avoid short-circuiting. The LMCO is encapsulated with a mixture of 90 wt % PTFE and 10 wt % PEDT-PSS by spray-drying, providing a conductive coating of about 5 S/cm at a thickness of about 35 nm, representing a volumetric particle loading of about 5%.

A 1.3 wt % aqueous dispersion of PEDT-PSS, (particle size ~30 nm, Baytron-PH, H. C. Starck) is mixed with an aqueous dispersion of PTFE (particle size 0.05-0.35 μm, Zonyl PTFE K-20, DuPont) that has been freed from surfactant by exhaustive dialysis against pure water. A minimum amount of nonionic perfluorinated surfactant is then added to aid final dispersion stability. The PEDT-PSS/PTFE mixture is prepared so that the ratio of solids PEDT-PSS:PTFE is 1:9. The volume of LMCO powder to be added to this mixture is calculated so that the volume ratio of LMCO:(PEDT-PSS+PTFE) is 95:5. A volume of water equal to the calculated volume of LMCO is added to the PEDT-PSS/PTFE mixture to dilute it, and then LMCO is added under high shear mixing to produce a well-dispersed mixture. The resulting mixture has a solids loading of about 50% by volume, with mass ratios of LMCO:PTFE:PEDT-PSS of 95:4.5:0.5. The mixture is spray-dried to form LMCO particles encapsulated with PEDT-PSS/PTFE.

In another experiment, LMCO is encapsulated with a mixture of 90 wt % PTFE and 10 wt % PEDT-PSS by a mechanofusion process. LMCO, water, PEDT-PSS, and PTFE latex are mixed as described above, and the mixture is subjected to a mechanofusion process. In this process, small particles of PTFE and PEDT-PSS are coated onto the surface of the LMCO particles by the force applied to the particles as the mixture is repeatedly passed through a narrow channel in a mechanofusion apparatus. This process also serves to make the particles more uniform in aspect ratio.

Self-Organizing Slurry

The electrolyte is a solid polymer electrolyte including polyethylene oxide (PEO) and lithium perchlorate (LiClO$_4$). In order to promote self-organization, the electrolyte is dissolved in solution to which the solid electrode components are added.

Poly(ethylene oxide) (PEO, 1 g, Polyox® WSR N80, Dow Chemical Co., molecular weight 200,000), is dissolved in 10 ml of acetonitrile by stirring and heating in a closed container for 1 hour at 50° C. Then 0.15 g of anhydrous lithium perchlorate is added to the solution (Li:O ratio 1:16) and stirred until the salt is completely dissolved; then 10 ml of diiodomethane is added. The PEO-Li salt complex solution is used to prepare a casting slurry by adding a predetermined amount of positive and negative active materials.

The anode material, mesocarbon microbeads (MCMB) with a mean grain size of ~5 μm, and the encapsulated LMCO cathode particles are mixed into the dissolved electrolyte in an anode to cathode capacity ratio of 1.05. The solids loading of the dried sauce is ~70%. The MCMB is combined with the electrolyte solution and magnetically stirred at ~70° C. As soon as the MCMB is completely wet, the encapsulated cathode is added. The mixture is magnetically stirred until well mixed at ~70° C.

Example 3

A high surface area interface battery is made using a self-organizing mixture as described in Example 2. The heated self-organizing slurry is fed into a hopper of a stencil printer. Individual battery sections are printed into stencils to provide a final battery stack that is 32 mm wide×48 mm long, with a thickness of 0.1 mm. The slurry is cast on a PEDT-PSS/PTFE-coated cathode collector as described in Example 2. An open mesh anode current collector is placed on top of the stencil. After vacuum curing, the energy density of the resulting symmetric cell about 600 Wh/l. 23 sections are stacked with a thin mylar layer placed between each one, providing a total battery thickness of 2.4 mm. The energy density of the resulting symmetric cell is about 575 Wh/l.

In another experiment, 14 individual sections are stacked with alternating sections flipped, such that the cathode and anode current collectors of adjacent sections are in contact with each other and the total battery thickness is 3.5 mm. The energy density of the resulting symmetric cell is 600 Wh/l.

Example 4

A self-organizing mixture as described in Example 2 is formed into a battery using injection molding. The heated mixture is injected at atmospheric pressure into a heated shaped preform with overall dimensions of about 30 mm×50 mm. The preform has three stepped layers. The bottom layer is 28 mm wide×48 mm long×2 mm deep, the middle layer is 30 mm wide×50 mm long×2 mm high, and the top layer is 32 mm wide×52 mm long×2 mm high. Prior to mixture injection, a current collector assembly is placed in the preform in an alternating sequence of coated cathode current collectors and anode current collectors. The current collectors have dimensions that allow them to fit at close tolerance in their respective preform layers. They are held apart at a separation of 2 mm by an inert polymeric fixture. The current collectors are mesh, with a "hard" temper to prevent shorting during mixture injection. After curing at atmospheric pressure, the cells are removed from the preform and the terminals are connected to the exposed collectors at each layer. The energy density of the resulting symmetric cell is 600 Wh/l.

Example 5

A battery having an arbitrary form factor, with final dimensions about 2×20×60 mm$^3$ and a patterned lower surface, is made using an injection molding process. A self-organizing mixture as described in Example 2 is injected into a perform having the desired arbitrary form factor. Prior to injection of the self-organizing mixture, a coated cathode current collector is pressed into a conformal shape on the bottom of the lower preform surface. After injection, an expanded metal anode current collector is placed over the mixture. The AC impedance at 1000 Hz is about 125 mΩ and the power density is less than 300 W/kg. The energy density of the final battery is 600 Wh/l, and its capacity is about 390 mAh. The average separation between cathode and anode is about 2 µm.

Example 6

An embedded battery is made directly in the casing of a laptop computer using stencil printing, with final dimensions of 1×300×240 mm$^3$. Four sequential stencil prints are carried out, each 0.25 mm thick. Each print is carried out by first depositing a thin coated cathode current collector, printing a self-organizing mixture as described in Example 2, covering the printed mixture with a mesh anode current collector, curing, and covering the anode current collector with a mylar sheet. The four layers are wired in parallel, resulting in a 14.8 V battery. The energy density of the final battery is 600 Wh/l and its capacity is about 2920 mAh. The AC impedance at 1000 Hz is about 2 mΩ and the power density is greater than 4,500 W/kg. The average separation between cathode and anode is 2 µm.

Example 7

A self-organized battery is made using tape casting. A heated self-organizing slurry as described in Example 2 is tape cast onto a heated and coated cathode current collector to a thickness of 4 mm and a width of 10 cm. An expanded metal anode current collector is held in position midway through the thickness of the sheet, and extends out either side of the 10 cm wide slab. Midway through the curing process, after the viscosity of the slab has increased and the repulsive forces between anode and cathode are still operative, the slab is cut once length wise and periodically width wise to form cells with dimensions of 5 cm×3 cm. An expanded metal coated cathode current collector is placed on top of each cell. After complete curing, cathode terminals are attached to either side of the cell and an anode terminal is attached to the extended current collector. The energy density of the symmetric cell is 600 Wh/l.

Example 8

A battery with final dimensions 6×32×48 mm$^3$ is made according to a tape casting process as described in Example 7. The battery has two expanded metal coated cathode current collectors and two expanded metal anode current collectors. The current collectors are equi-spaced through the thickness of the cell, creating three layers that are each 2 mm thick. The AC impedance at 1000 Hz is ~31 mΩ and the power density is greater than 300 W/kg. The energy density of the final battery is 600 Wh/l and its capacity is about 1495 mAh. The average separation between cathode and anode is 2 µm.

As will be apparent to one of skill in the art from a reading of this disclosure, the present invention can be embodied in forms other than those specifically disclosed above without departing from the spirit or essential characteristics of the invention. The particular embodiments of the invention described above are, therefore, to be considered as illustrative and not restrictive. The scope of the invention is as set forth in the appended claims, rather than being limited to the examples contained in the foregoing description.

The invention claimed is:

1. A bipolar article, the article comprising:
(a) a housing comprising an inside surface and an outside surface; wherein the inside surface has an arbitrary form factor which is independent of the form factor of the outside surface and is not cylindrical or prismatic;
(b) a bipolar structure comprising a cathode current collector, an anode current collector, an anode, a cathode, and an electrolyte in contact with and separating the anode and cathode; wherein the anode and cathode are interpenetrating; the cathode current collector is in electronic communication with the cathode; and the anode current collector is in electronic communication with the anode; wherein the bipolar structure as a whole has an arbitrary form that is not cylindrical or prismatic; and at least one of the cathode, the anode, and their respective current collectors has an arbitrary form that is not cylindrical or prismatic and is conformal to the inside surface of the housing.

2. The bipolar article of claim 1, wherein the housing is an outer casing of the bipolar article.

3. The bipolar article of claim 1, wherein the housing is a housing of a battery powered device.

4. The bipolar article of claim 1, wherein the anode, electrolyte, and cathode are sequentially deposited.

5. The bipolar article of claim 1, wherein the bipolar article is a battery.

6. The bipolar article of claim 1, wherein the anode includes one or more materials selected from the group consisting of carbon, amorphous carbon, graphite, mesocarbon microbeads, Li, LiAl, Li$_9$Al$_4$, Li$_3$Al, Zn, LiZn, Ag, LiAg, Li$_{10}$Ag$_3$, B, Li$_5$B$_4$, Li$_7$B$_6$, Ge, Si, Li$_{12}$Si$_7$, Li$_{21}$Si$_8$, Li$_{13}$Si$_4$, Li$_{21}$Si$_5$, Sn, Li$_5$Sn$_2$, Li$_{13}$Sn$_5$, Li$_7$Sn$_2$, Li$_{22}$Sn$_5$, Sb, Li$_2$Sb, Li$_3$Sb, Bi, LiBi, and Li$_3$Bi, SnO$_2$, SnO, MnO, Mn$_2$O$_3$, MnO$_2$, Mn$_3$O$_4$, CoO, NiO, FeO, LiFe$_2$O$_4$, TiO$_2$, LiTi$_2$O$_4$, and glass.

7. The bipolar article of claim 1, wherein the cathode includes one or more materials selected from the group consisting of $LiCoO_2$, $LiCoO_2$ doped with Mg, $LiNiO_2$, $LiMn_2O_4$, $LiMnO_2$, $LiMnO_2$ doped with Al, doped and undoped $LiFePO_4$, $LiMnPO_4$, $Li_xV_6O_{13}$, $Li_2Fe_2(SO_4)_3$, $V_2O_5$, $V_6O_{11}$, and $SnO_2$.

8. The bipolar article of claim 1, having a power density greater than about 300 W/kg.

9. A device comprising the bipolar article of claim 1.

10. The device of claim 9, wherein the arbitrary form factor of the bipolar article is conformal with at least one surface of the device.

11. The device of claim 9, wherein the device has a cavity, and wherein the arbitrary form factor of the bipolar article is space-filling within the cavity.

12. The device of claim 9, wherein the device is a cellular telephone, laptop computer, personal digital assistant, or toy.

* * * * *